(12) United States Patent
Yurko et al.

(10) Patent No.: US 11,109,726 B2
(45) Date of Patent: Sep. 7, 2021

(54) MODULAR VACUUM CLEANER

(71) Applicant: SHOP VAC CORPORATION, Williamsport, PA (US)

(72) Inventors: Michael Z. Yurko, Endicott, NY (US); Neil N. Norell, Candor, NY (US)

(73) Assignee: SHOP VAC CORPORATION, Williamsport, PA (US)

( * ) Notice: Subject to any disclaimer, the term of this patent is extended or adjusted under 35 U.S.C. 154(b) by 286 days.

(21) Appl. No.: 16/305,779

(22) PCT Filed: Jul. 18, 2017

(86) PCT No.: PCT/US2017/042592
§ 371 (c)(1),
(2) Date: Nov. 29, 2018

(87) PCT Pub. No.: WO2018/017568
PCT Pub. Date: Jan. 25, 2018

(65) Prior Publication Data
US 2020/0337511 A1 Oct. 29, 2020

Related U.S. Application Data

(60) Provisional application No. 62/474,293, filed on Mar. 21, 2017, provisional application No. 62/379,129, (Continued)

(51) Int. Cl.
*A47L 5/38* (2006.01)
*A47L 9/14* (2006.01)
(Continued)

(52) U.S. Cl.
CPC ............... *A47L 5/38* (2013.01); *A47L 9/122* (2013.01); *A47L 9/1409* (2013.01); *A47L 9/242* (2013.01);
(Continued)

(58) Field of Classification Search
CPC .......... A47L 5/38; A47L 9/122; A47L 9/1409; A47L 9/242; A47L 9/2868
(Continued)

(56) References Cited

U.S. PATENT DOCUMENTS 3,146,081 A * 8/1964 Emdy ...................... A47L 5/38
55/315
4,613,348 A * 9/1986 Natale ................... A47L 9/122
15/347
(Continued)

FOREIGN PATENT DOCUMENTS

EP 0657587 A1 6/1995
EP 0674869 A1 10/1995
(Continued)

OTHER PUBLICATIONS

International Preliminary Report on Patentability and Written Opinion, corresponding to International Application No. PCT/US2017/042592, dated Jan. 22, 2019.
(Continued)

*Primary Examiner* — Marc Carlson
(74) *Attorney, Agent, or Firm* — Marshall, Gerstein & Borun LLP

(57) ABSTRACT

Vacuum cleaners to be mounted in a vehicle are disclosed. Some of the vacuum cleaners have a modular design that allows the vacuum cleaners to be arranged, assembled, and/or installed in different configurations and to fit in different spaces within the vehicle. Vacuum cleaners may include a vacuum module, a collector module, and/or a hose storage module. An interconnecting duct is configured to operatively couple the vacuum module and the collector module in any one of a plurality of different predefined assembly configurations. The collector module may have a debris canister that may be lifted straight out of a collector housing. The vacuum cleaner may be installed in a vehicle
(Continued)

in a manner to allow easy removal of the debris canister without disconnecting and/or removing other portions of the vacuum cleaner.

23 Claims, 20 Drawing Sheets

Related U.S. Application Data filed on Aug. 24, 2016, provisional application No. 62/364,183, filed on Jul. 19, 2016.

(51) Int. Cl.
| | |
|---|---|
| *A47L 9/24* | (2006.01) |
| *A47L 9/12* | (2006.01) |
| *A47L 9/28* | (2006.01) |
| *B60S 1/64* | (2006.01) |

(52) U.S. Cl.
CPC ............ *A47L 9/248* (2013.01); *A47L 9/2868* (2013.01); *B60S 1/64* (2013.01)

(58) Field of Classification Search
USPC ............................................................ 15/313
See application file for complete search history.

(56) References Cited

U.S. PATENT DOCUMENTS

| | | | | |
|---|---|---|---|---|
| 4,726,825 | A | * | 2/1988 | Natale ................. A47L 9/102 55/318 |
| 5,189,753 | A | * | 3/1993 | Sousa .................... B60S 1/64 15/313 |
| 5,829,091 | A | * | 11/1998 | Ingram .................. A47L 5/38 15/313 |
| 6,128,804 | A | | 10/2000 | Lee et al. |
| 6,148,472 | A | | 11/2000 | Arena |
| 6,490,751 | B2 | | 12/2002 | Ganzenmuller |
| 6,553,610 | B1 | | 4/2003 | Shideler |
| 6,691,939 | B2 | * | 2/2004 | Grimes .................. A47L 5/38 241/46.17 |
| 6,813,805 | B2 | | 11/2004 | Ganzenmuller |
| 7,152,272 | B2 | | 12/2006 | Rukavina et al. |
| 7,266,859 | B2 | | 9/2007 | Slone |
| 7,480,957 | B2 | | 1/2009 | Ganzenmuller, V |
| 8,347,452 | B2 | | 1/2013 | Maehata et al. |
| 8,615,845 | B2 | | 12/2013 | Norell et al. |
| 9,499,134 | B2 | | 11/2016 | Camiller |
| 9,751,504 | B2 | | 9/2017 | Schultz et al. |
| 10,099,659 | B1 | | 10/2018 | Williams et al. |
| 2003/0167590 | A1 | | 9/2003 | Oh |
| 2003/0217432 | A1 | | 11/2003 | Oh et al. |
| 2004/0107528 | A1 | | 6/2004 | LeClear et al. |
| 2004/0134013 | A1 | | 7/2004 | Slone |
| 2005/0011035 | A1 | * | 1/2005 | Rukavina .............. A47L 7/0076 15/313 |
| 2005/0066468 | A1 | * | 3/2005 | Ganzenmuller .......... B60S 1/64 15/313 |
| 2005/0273969 | A1 | | 12/2005 | Watson et al. |
| 2006/0080801 | A1 | | 4/2006 | Nameth |
| 2006/0085940 | A1 | * | 4/2006 | Chernoff ................. B60S 1/64 15/313 |
| 2010/0005612 | A1 | | 1/2010 | Moore |
| 2010/0083456 | A1 | * | 4/2010 | Norell .................. A47L 9/1427 15/347 |
| 2010/0083457 | A1 | * | 4/2010 | Norell .................. A47L 9/1436 15/347 |
| 2010/0242206 | A1 | | 9/2010 | Maehata et al. |
| 2012/0210536 | A1 | | 8/2012 | Jan et al. |
| 2014/0130293 | A1 | | 5/2014 | Lee et al. |
| 2015/0307066 | A1 | * | 10/2015 | Camiller ............... A47L 9/2873 296/37.13 |
| 2016/0068141 | A1 | | 3/2016 | Schultz et al. |
| 2016/0368461 | A1 | * | 12/2016 | Logli, Jr. ................ B60S 1/64 |
| 2017/0172361 | A1 | * | 6/2017 | Sauer ................... A47L 9/1436 |
| 2018/0103814 | A1 | * | 4/2018 | Harman .................. A47L 5/38 |
| 2018/0360279 | A1 | * | 12/2018 | Garcia Vila .......... A47L 9/1472 |
| 2020/0031319 | A1 | * | 1/2020 | Belanger ................. A47L 7/04 |
| 2020/0062223 | A1 | * | 2/2020 | Norell ................... A47L 9/248 |
| 2020/0129022 | A1 | * | 4/2020 | Gottschall .............. A47L 9/122 |
| 2020/0317162 | A1 | * | 10/2020 | Yurko ..................... B60S 1/64 |

FOREIGN PATENT DOCUMENTS

| | | | |
|---|---|---|---|
| WO | WO-91/18773 A1 | 12/1991 | |
| WO | WO-2006/088434 A1 | 8/2006 | |
| WO | WO-2014112786 A1 * | 7/2014 | ............... A47L 9/10 |
| WO | WO-2017/031030 A1 | 2/2017 | |

OTHER PUBLICATIONS

International Preliminary Report on Patentability and Written Opinion, corresponding to International Application No. PCT/US2017/042602, dated Jan. 22, 2019.

International Preliminary Report on Patentability and Written Opinion, corresponding to International Application No. PCT/US2017/042616, dated Jan. 22, 2019.

European Search Report and Opinion for European Application No. 18162948.6, dated Jul. 26, 2018.

International Search Report and Written Opinion, corresponding International Application No. PCT/US2017/042592, dated Mar. 19, 2018.

International Search Report and Written Opinion, corresponding International Application No. PCT/US2017/042602, dated Feb. 26, 2018.

International Search Report and Written Opinion, corresponding International Application No. PCT/US2017/042616, dated Mar. 3, 2018.

* cited by examiner

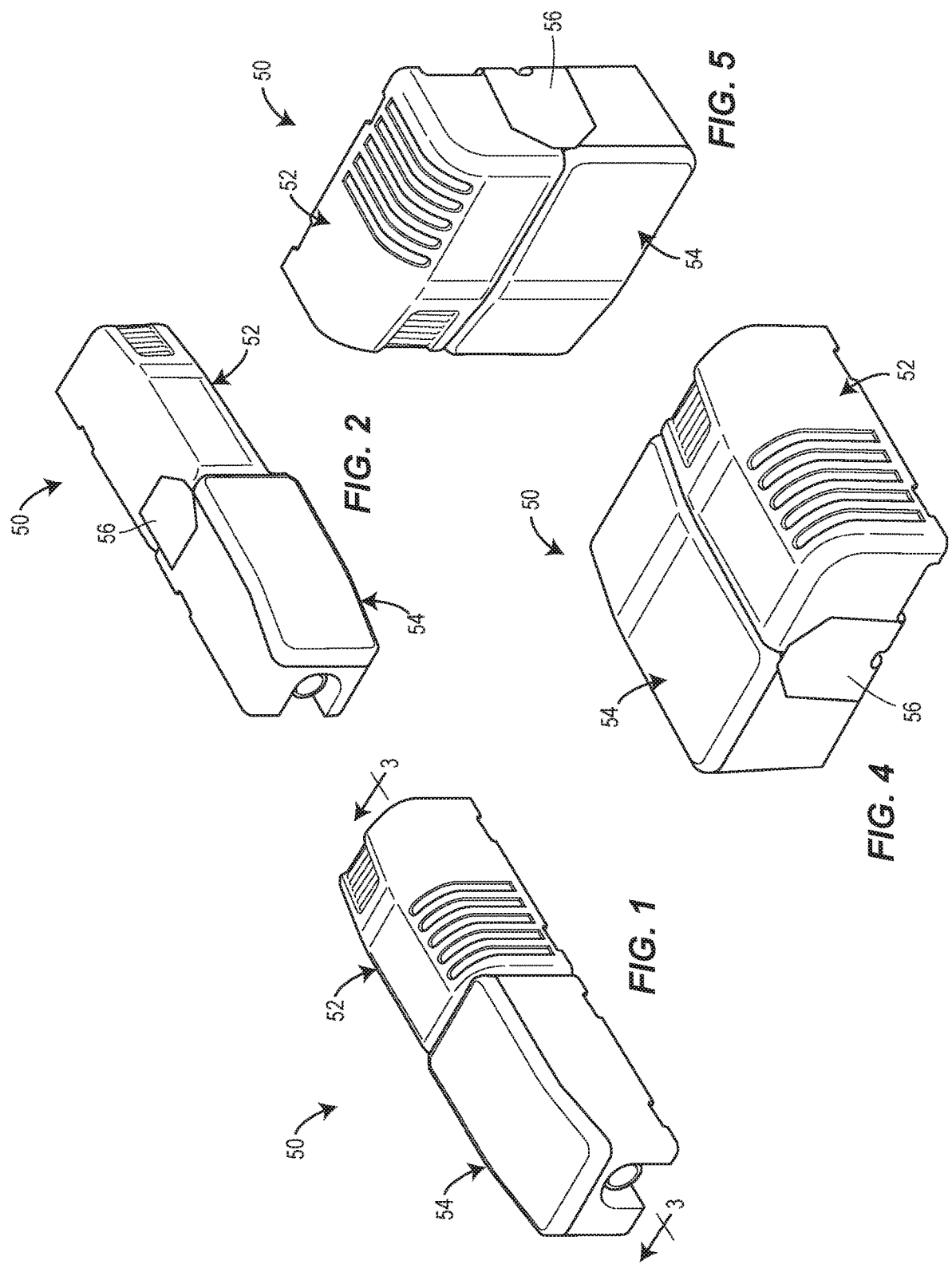

MODULAR VACUUM CLEANER

FIELD OF THE INVENTION

The present invention relates generally to a vacuum cleaner that can be configured in a variety of ways, for instance to be mounted in a number of locations in a vehicle.

BACKGROUND

In order to clean a vehicle, such as a car or truck, a vacuum cleaner is often used to vacuum out dirt and debris. However, it can be awkward and/or inconvenient to use a typical in-home vacuum cleaner to clean out the interior of a vehicle. To address this inconvenience, attempts have been made to permanently install on-board vehicle vacuum cleaners inside the vehicle. However, the known on-board vehicle vacuum cleaners typically have a complex and dedicated installation arrangement, which limits the usage across different vehicles and/or in different arrangements within a vehicle.

SUMMARY

It is an object of the present disclosure to provide one or more vacuum cleaners to be mounted in a vehicle that improve upon previously known on-board vehicle vacuum cleaners.

According to some aspects of the present disclosure, a vacuum cleaner configured to be mounted in a vehicle includes a vacuum module configured to draw a vacuum, a collector module configured to collect debris, and an interconnecting duct that operatively couples the vacuum module to the collector module such that the vacuum module pulls air into, through, and out of the collector module when drawing a vacuum, wherein the collector module may be operatively coupled to the vacuum module in any one of a plurality of arrangements. The interconnecting duct may be configured to allow the collector module to be operatively coupled to the vacuum module in any one of the plurality of arrangements.

According to some aspects of the present disclosure, a vacuum cleaner configured to be mounted in a vehicle includes a vacuum module configured to draw a vacuum, a collector module configured to collect debris, and an interconnecting duct that operatively couples the vacuum module to the collector module such that the vacuum module pulls air into, through, and out of the collector module when drawing a vacuum. A bracket may be provided that rigidly couples the vacuum module to the collector module.

In further accordance with any one or more of the foregoing aspects and exemplary arrangements, a vacuum cleaner according to the teachings of the present disclosure may include any one or more of the following optional features and/or arrangements in any functionally useful combination.

The plurality of arrangements may include an in-line configuration, a perpendicular configuration, and/or a side-by-side configuration. However, other arrangements are also possible. The vacuum module may be disposed immediately adjacent the collector module or the vacuum module may be maintained at a predefined distance from the collector module by the interconnecting duct with a gap disposed between the vacuum module and the collector module. The collector module, the motor/impeller unit, and the hose compartment may be arranged in an in-line configuration.

The vacuum module may include a motor/impeller unit disposed within a motor housing. The motor/impeller unit may include an electric motor, an impeller assembly, and a controller. The motor/impeller unit may further include power electronics and/or a heat sink. In some arrangements, the power electronics and/or the heat sink is disposed at opposing perpendicular angles relative to a printed circuit board (PCB) of the controller. The impeller assembly and the motor may be axially aligned in-line with each other. Any heat sink may also be axially aligned with the impeller assembly and the motor. The controller and the power electronics and/or the heat sink may be arranged in a saddle-shaped arrangement over and/or around the motor. A motor/impeller unit according to one or more of these features can provide a relatively small package outline, which may be useful for increasing the possible installation arrangements within a vehicle. The vacuum module may include an intake receiver configured to receive at least one end of the interconnecting duct.

The collector module may include a collector housing and a debris canister removably disposed in the collector housing. The debris canister may be configured to be slidably removed from and/or reinserted into the collector housing. The collector module may include a mounting bracket. The motor/impeller unit may be attached to the collector module with the mounting bracket. The collector housing may include a hose connector coupled to an air inlet. The hose connector may be configured to be coupled to a vacuum hose. A vacuum hose may be coupled to the hose connector. The vacuum hose may be flexible.

The interconnecting duct may have a substantially rigid body that forms a fluid flow duct in the form of a U-shaped tube extending from a first duct opening at a first end of the tube to a second duct opening at a second end of the tube. The U-shaped tube may have a first leg and a second leg extending upwardly from opposite ends of a base section, the first duct opening formed at the distal end of the first leg, and the second duct opening formed at the distal end of the second leg. Central axes of the first leg and the second leg may be parallel with each other and perpendicular to a central axis of the base section. The U-shaped tube may have a substantially circular cross-section along its entire length from the first end to the second end and/or form substantially circular first and second duct openings.

The vacuum module and the collector module may be configured to fit into a space between two seats of the vehicle when operatively coupled together. The vacuum module and the collector module may be configured to fit within a console housing. The console housing may be a center console.

A bracket may connect the collector module to the vacuum module. The bracket may attach the collector housing to the motor housing. The bracket may extend downwardly from the collector module. The collector module may be disposed at a slightly elevated level compared to the vacuum module in a stepped configuration. The downwardly extending bracket may support the collector module in the stepped configuration. The bracket may be substantially parallel with a bottom wall of the motor housing and/or the collector housing. The bracket may be received within a recess cavity in the bottom wall of the collector housing. The bracket may be a unitary part of the motor housing and/or the collector housing.

One or more seals, such as compression gaskets, may form one or more seals between the debris canister and the collector housing around the various openings. The seals may provide improved efficiency of the vacuum cleaner by preventing unwanted air intake along the air flow path from the hose connector to the impeller assembly.

A filter, such as a screen or filter media, may be arranged to prevent dirt and/or debris from being drawn from the debris canister into the motor/impeller unit. For example, a screen or other filter media may cover the clean air exhaust port. The filter may be removably secured to the debris canister, for example with a clamping arrangement such as a clamp ring.

A hose storage module may be attached to the collector module. The vacuum hose may be stored inside the hose storage module. A lid may be configured to be opened to allow access to the vacuum hose stored inside the hose compartment, and configured to be closed to cover the vacuum hose stored inside hose compartment.

According to some aspects of the present disclosure, a vehicle may have installed therein any one or more of the vacuum cleaners and any one or more of the components disclosed herein. The vehicle may be a car, a truck, an SUV, an airplane, a boat, a tractor, and so on. The vacuum cleaner may be installed completely or partially within the passenger compartment of the vehicle. Preferably the vacuum cleaner is installed so that a vacuum hose of the vacuum cleaner is disposed on the interior of the passenger compartment. The vacuum cleaner may be installed in a center console in the passenger compartment. The vacuum cleaner may be installed in other locations in the passenger compartment. One or both of the motor housing and the collector housing may be fixedly attached to the vehicle. The debris canister may be configured to be slidably removed from and/or slidably reinserted into the collector housing without disconnecting the collector housing or the motor housing from the vehicle.

Additional optional aspects, arrangements, forms, and/or advantages of the vacuum cleaners disclosed herein will be apparent upon consideration of the following detailed description and the appended drawings, each different functionally operable and technically effective combination of which is expressly included as a part of the present disclosure.

BRIEF DESCRIPTION OF THE DRAWINGS

FIG. 1 is an isometric view of a vacuum cleaner to be mounted inside a vehicle according to the present disclosure in a first assembly arrangement and installation orientation;

FIG. 2 is another isometric view of the vacuum cleaner of FIG. 1 in another installation orientation;

FIG. 4 is an isometric view of the vacuum cleaner of FIG. 1 in a second assembly arrangement and installation orientation;

FIG. 5 is another isometric view of the vacuum cleaner of FIG. 1 in the second assembly arrangement in another installation orientation;

DETAILED DESCRIPTION

Turning now to the drawings, FIGS. 1-9 illustrate an in-vehicle vacuum cleaner 50 according to some aspects of the disclosure. The vacuum cleaner 50 is configured to be installed and operated within a vehicle, such as a car or truck or other type of vehicle. Preferably, the vacuum cleaner 50 is configured to be installed within a passenger compartment of the vehicle to provide easy access and use of the vacuum cleaner for cleaning the interior of the passenger compartment. The vacuum cleaner can be installed in other parts of the vehicle, such as a hatch or the trunk, and may be used in environments other than vehicles.

Figure 3:
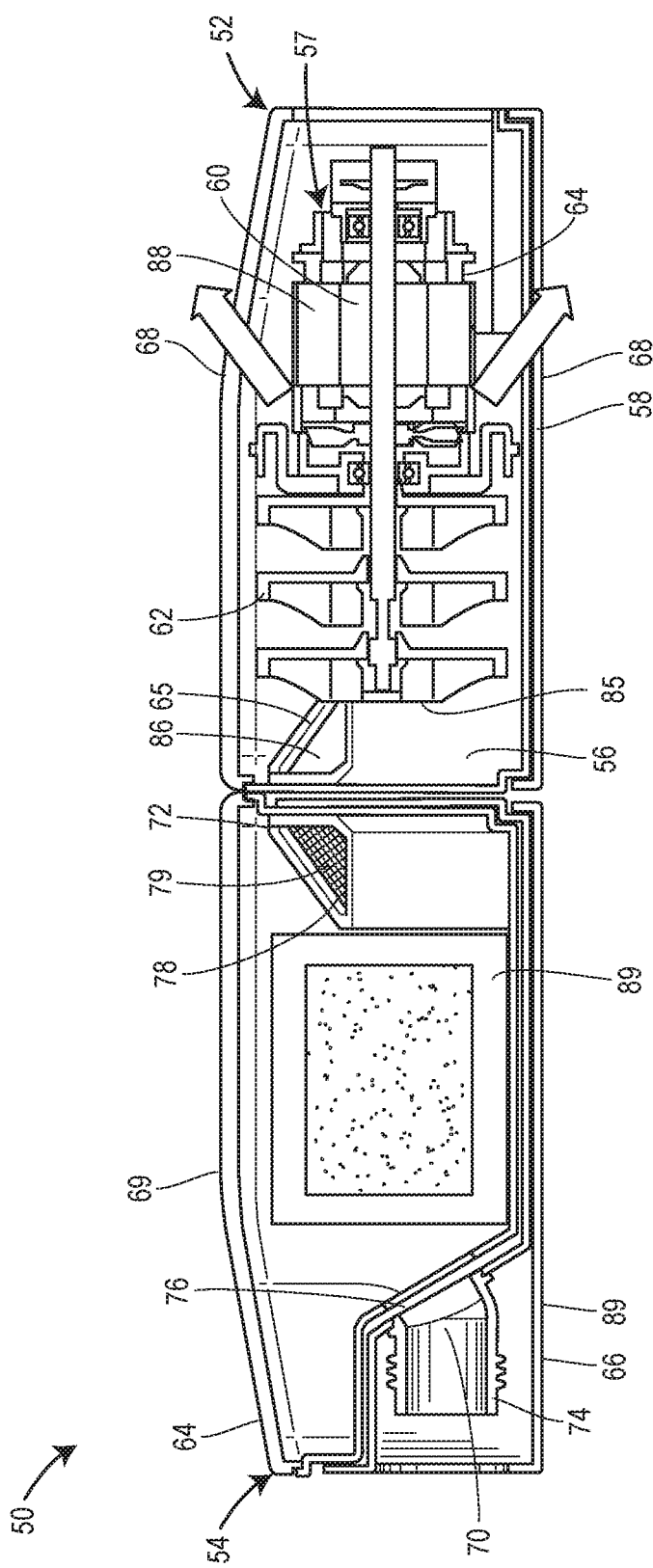
FIG. 3 is a longitudinal cross-sectional view along the lines 3-3 of FIG. 1.
Figure 6:
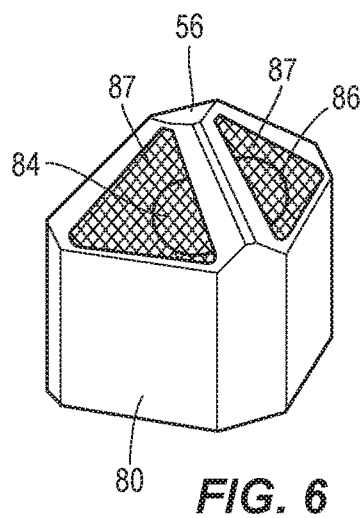
FIG. 6 is an isometric view of an interconnecting duct of the vacuum cleaner of FIG. 1.
Figure 7:
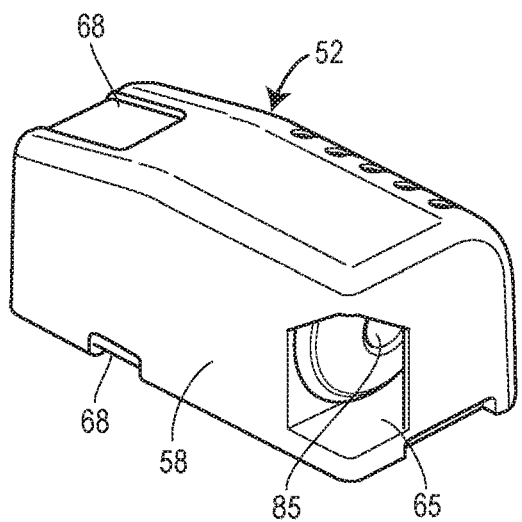
FIG. 7 is an isometric view of a vacuum module of the vacuum cleaner of FIG. 1.
Figure 8:
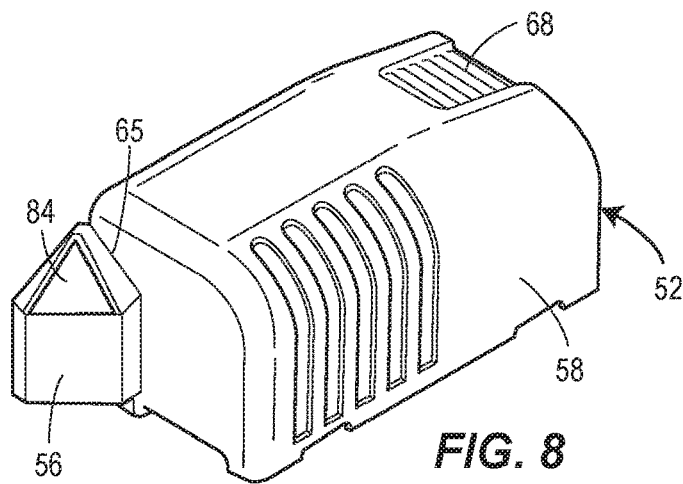
FIG. 8 is an isometric view of the vacuum module and the interconnecting duct assembled in accordance with the first assembly arrangement of FIGS. 1 and 2.
Figure 9:
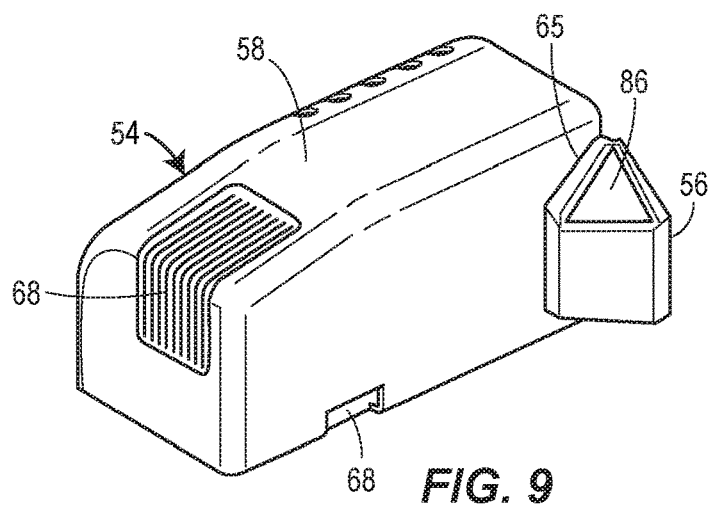
FIG. 9 is an isometric view of the vacuum assembly and the interconnecting duct assembled in accordance with the second assembly arrangement of FIGS. 4 and 5.

The vacuum cleaner 50 has a modular configuration, including a vacuum module 52 and a collector module 54 that can be connected to each other as an integrated unit in any of a plurality of different assembly arrangements (which may be pre-defined) with an interconnecting duct 56. The interconnecting duct 56 may be flexible, but can also have a fixed shape that allows the collector module 54 to be operatively connected to the vacuum module 52 in only a limited number of predefined assembly arrangements. For example, FIGS. 1-3 illustrate the vacuum cleaner 50 with the collector module 54 operatively connected to the vacuum module 52 in an in-line configuration, and FIGS. 4 and 5 illustrate the vacuum cleaner 50 with the collector module 54 operatively connected to the vacuum module 52 in a side-by-side configuration. Furthermore, FIG. 1 illustrates the vacuum cleaner in the in-line configuration disposed in an upright installation orientation, whereas FIG. 2 illustrates the vacuum cleaner in the in-line configuration disposed in a sideways installation orientation. Similarly, FIG. 4 illustrates the vacuum cleaner in the side-by-side configuration disposed in an upright or vertical installation orientation, whereas FIG. 5 illustrates the vacuum cleaner in the side-by-side or horizontal configuration in a sideways installation orientation.

Because of its modular design, the vacuum cleaner 50 can be easily assembled and/or oriented in many different shapes and orientations, which provides the advantage of being able to easily configure the vacuum cleaner 50 to fit different shapes and/or configurations of spaces within a vehicle while maintaining the vacuum cleaner 50 as an integrated unit. For example, the vacuum cleaner 50 may be configured and oriented to fit in a space between seats, such as within a center console, or the vacuum cleaner 50 may be configured and oriented to fit on the side or underneath a seat, in a space along the side wall of a cargo bay or passenger compartment of a sport utility vehicle (SUV), in the trunk, and so on. However, because the interconnecting duct 56 can have a substantially rigid shape and couples the collector module 54 to the vacuum module 52 in orientations as an integral unit, the vacuum cleaner 50 can be easily installed and/or removed and/or otherwise moved around as a single unit, which may provide easier handling of the vacuum cleaner 50 as compared to a vacuum cleaner that is not connected together as an integrated unit.

FIG. 3 illustrates in greater detail various components of the vacuum cleaner 50 in the assembled configuration corresponding with FIGS. 1 and 2. However, the same components are also provided in the assembled configuration of FIGS. 4 and 5.

The vacuum module 52 includes a motor/impeller unit 57 bundled together as a single component within a motor housing 58. The motor housing 58 in this arrangement is in the form of an outer shell having a generally elongate rectangular form. However, the motor housing 58 may take many different forms, shapes and sizes depending upon the particular space needs and/or arrangements desired for installation in a particular vehicle. The motor/impeller unit 57 includes a motor 60 that drives an impeller assembly 62 and a controller 64 that controls the motor 60. The motor 60 can be of any design suitable for vacuum cleaners, including standard motors with brushes or brushless motors, including switched reluctance motors. The impeller assembly 62 may take any form suitable for moving air in a manner that will create a vacuum. In this arrangement, the impeller assembly 62 includes three in-line impellers. However, other forms of the impeller assembly 62 may also be used. The motor 60 is operatively coupled to the impeller assembly 62 in order to drive the impellers to create a vacuum. The controller 64 includes suitable electronics, such as a PCB board and/or other appropriate electronic control circuits configured to control the motor 60. As most easily seen in FIGS. 3 and 7, the motor housing 58 includes an intake opening 65 that forms a duct receiver and an air inlet for air that is drawn into the impeller assembly 62 and one or more air outlet openings 68 for exhausting air exhausted from the impeller assembly 62.

The collector module 54 includes a debris canister 64 disposed within a collector housing 66. The debris canister 64 includes a lid 69 that can be selectively opened to provide access to the interior of the debris canister 64. The debris canister 64 is removably received within the collector housing 66 such that the debris canister 64 can be slidably removed from and returned into the collector housing 66. The collector housing 66 also includes an air inlet 70 at one end of the housing and an air exhaust opening 72 is the opposite end of the collector housing 66. A hose connector 74 extends outwardly from the air inlet 70 for coupling with a vacuum hose (not shown). The air exhaust opening 72 also informs a duct receiver and an air outlet. The debris canister 64 also includes an air intake opening 76 and an air outlet opening 78. The air intake opening 76 and the air outlet opening 78 of the debris canister 64 align with the air inlet 70 and the air exhaust opening 72 of the collector housing 66, respectively, when the debris canister 64 is operatively disposed within the collector housing 66, as shown in FIG. 3.

As best seen in FIGS. 3 and 6-9, the interconnecting duct 56 has a substantially rigid body 80 that forms a duct 82 extending from a first duct opening 84 to a second duct opening 86. As will become apparent from the remainder of the description, the interconnecting duct 56 may have different shapes and sizes depending upon the particular arrangements desired for the vacuum cleaner 50. In this exemplary arrangement, the interconnecting duct 56 has a generally triangular shape with the first duct opening 84 defined on one half of the triangular shape, and the second duct opening 86 defined on the opposite half of the triangular shape. One end of the interconnecting duct 56 is received within the air exhaust opening 72 of the collector housing 66 such that the duct opening 84 is aligned with the air outlet opening 78 of the debris canister 64. At the same time, the other end of the interconnecting duct 56 is received within the intake opening 65 of the motor housing 58 with the duct opening 86 in fluid connection with the air intake 85 of the impeller assembly 62. Thus, when the motor 60 is turned on, the impeller assembly 62 draws air into the inlet 70, through the debris canister 64 and out the air outlet opening 78, through the interconnecting duct 56 and into the air intake of the impeller assembly 62, and from there is exhausted out the air outlet openings 78. As can be seen from FIGS. 1, 2, 4, 5, 8, and 9, the interconnecting duct 56 has a shape and form such that the vacuum module 52 can be operatively connected to the collector module 54 in at least two, and possibly more, different assembly arrangements.

One or more screens or filters 87 may be disposed across the air outlet opening 78 of the debris canister 64 and/or one or both of the duct openings 84 and 86 to prevent debris that is sucked into the debris canister 64 from traveling out of the debris canister and into the vacuum module 52, where the debris could enter into the impeller assembly 62. A pleated type filter 79 may be located in the canister 64 and connected to the air outlet 78 to provide an extra level of filtering before the air exits the canister 64. The filter 79 may take the shape of the air outlet 78 and, in one example, may be cylindrical or triangular in shape. In addition, the filter 79 may be a screen or other filter media that covers the air outlet 78 to remove particulate matter that may be drawn through the canister 64. In this way, the air that is pulled into the motor/impeller unit 57 through the interconnecting duct 56 will be substantially free of dirt and debris, which could otherwise damage the impellers or other portions of the motor/impeller unit 57. The filter 79 is preferably removable to allow for easy cleaning. The filter 79 may be removably secured to the air outlet 78 by any method or means known to those of ordinary skill in the art, including, but not limited to, one or more of a clamp, a clamp collar, screws, or any other securing mechanism. However, other arrangements for securing the filter 354 are possible. In addition, the filter 79 may be optionally permanently secured across the clean air exhaust port 352 or the omitted entirely. Additionally or alternatively, a filter bag 89 may be disposed and arranged inside the debris chamber 64 connected to the air intake opening 76 to collect debris that is drawn into the air inlet 70.

Figure 10:
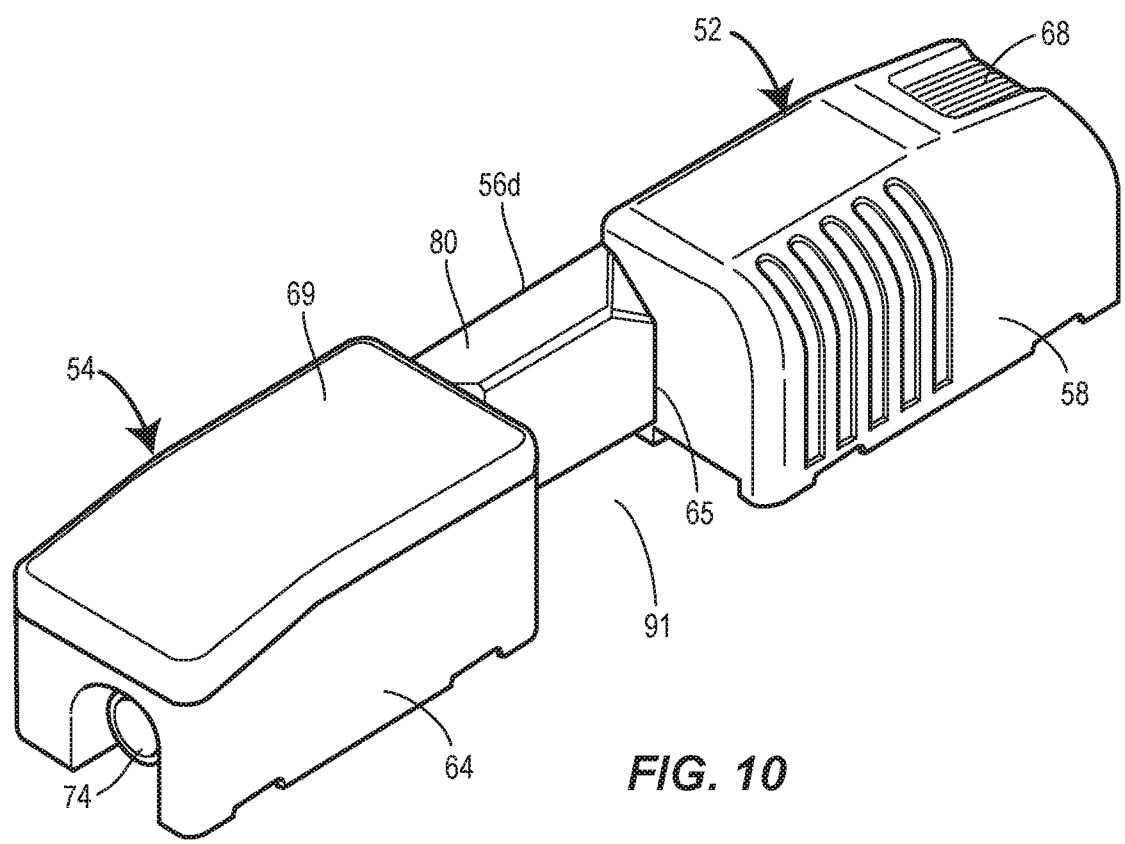
FIG. 10 is an isometric view of a vacuum cleaner similar to FIG. 1, but with a longer interconnecting duct.
Figure 11:
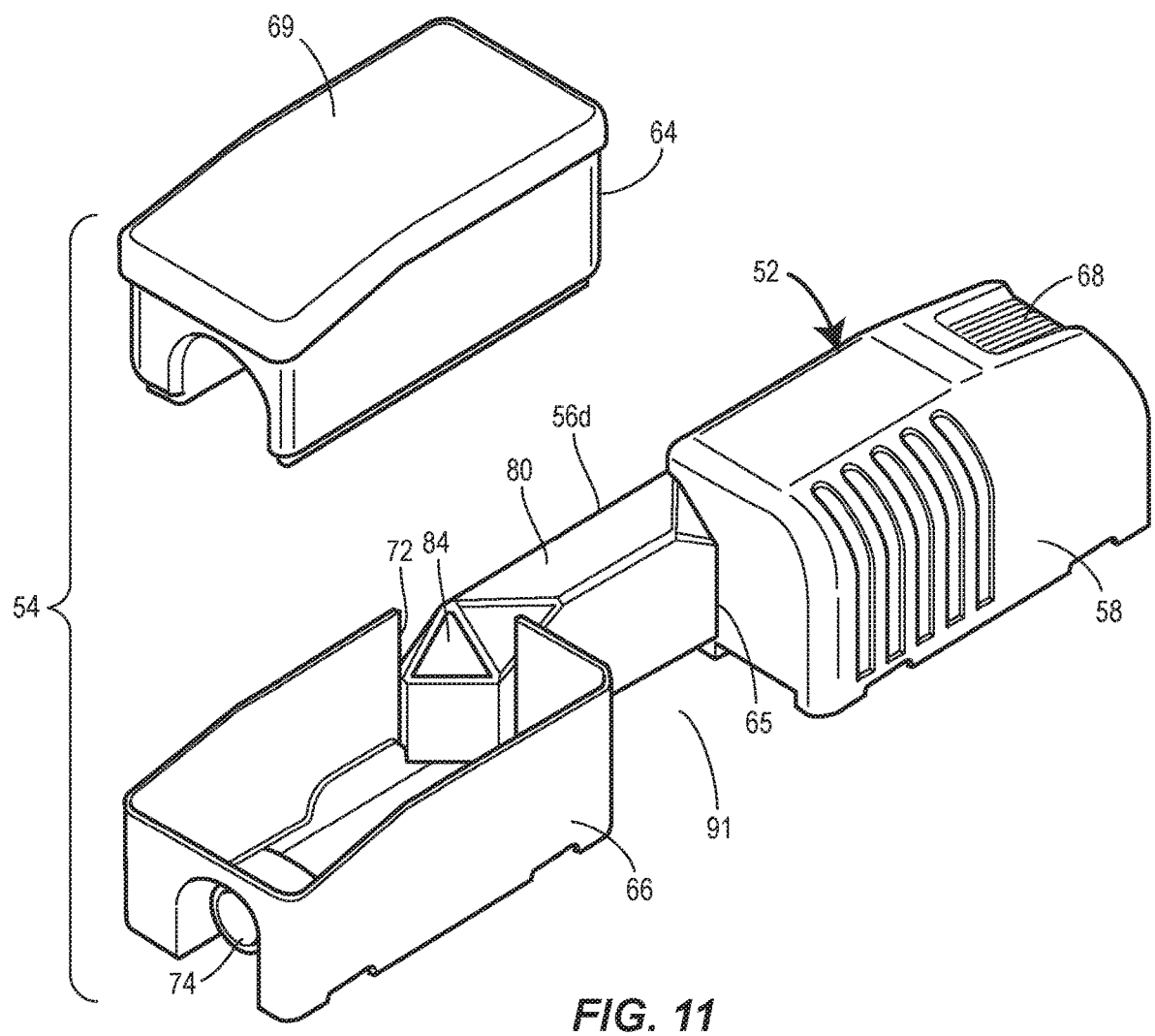
FIG. 11 is a partly exploded isometric view of the vacuum cleaner of FIG. 10.

FIGS. 10 and 11 illustrate the vacuum cleaner 50 with the vacuum module 52 and the collector module 54 and operatively connected together with a longer interconnecting duct 56a. The vacuum module 52 and the collector module 54 are substantially identical as previously described. Further, the interconnecting duct 56a is generally similar to the interconnecting duct 56, except that the body of the duct extending from the duct opening 84 to the duct opening 86 is longer. The remaining portions of the interconnecting duct 56a are substantially the same as the interconnecting duct 56. Thus, whereas the vacuum module 52 and the collector module 54 are disposed immediately adjacent to each other with adjacent sidewalls touching when operatively joined by the interconnecting duct 56, when operatively joined by the interconnecting duct 56a, the vacuum module 52 and the collector module 54 are spaced apart from each other, thus forming a gap 91 between the vacuum module 52 and the collector module 54 as illustrated in FIGS. 10 and 11. Thus, the longer interconnecting duct 56 a allows the option of a collector module 54 to be positioned remotely from the vacuum module 52.

FIG. 11 also more clearly illustrates how the debris canister 64 can be simply and easily removed the collector housing 66, such as by being slid out of top end of the collector housing 66. In this way, debris collected within the debris canister 64 can be simply and easily removed by pulling the debris canister 64 up out of the collector housing 66, opening the lid 69, and dumping the debris out of the interior and/or removing a filter bag 89 if used. This allows debris to be easily removed from the collector module 54 without having to remove the entire vacuum assembly 50 or even the entire collector module 54 from the vehicle. Further, the hose connection remains undisturbed when the debris canister 64 is removed from the collector housing 66. It also allows removal of the canister 64 while it is still covered, minimizing the chances that its removal will result in its contents being spilled.

Figure 12:
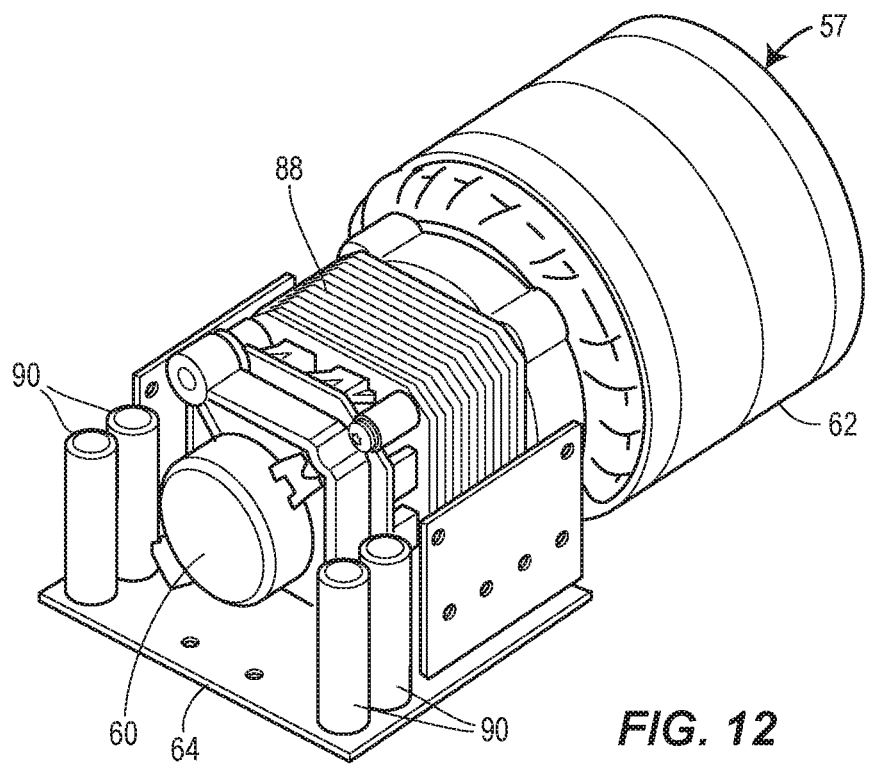
FIG. 12 is an isometric view of the motor/induction unit of the vacuum module of FIG. 1.
Figure 13:
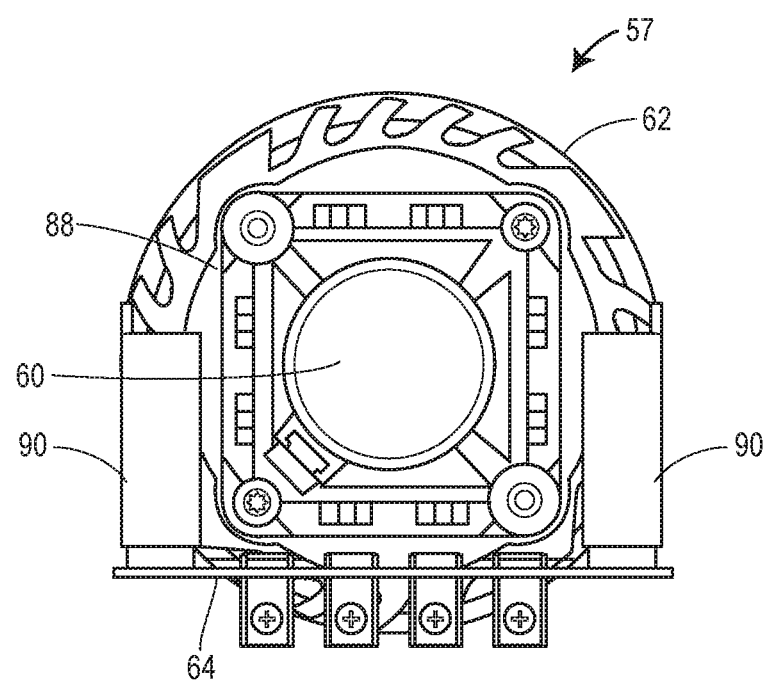
FIG. 13 is an end view of the motor/induction unit of FIG. 12.

FIGS. 12 and 13 show the motor/impeller unit 57, including the motor 60, the impeller assembly 62, and the controller 64, in isolation from the remaining portions of the vacuum module 52. In this arrangement, the motor 60 is disposed in-line along the axis of the impeller assembly 62. The PCB of the controller 64 is disposed adjacent the motor 60 and axially aligned with the impeller assembly 62, and a heat sink 88 in the form of a plurality of parallel heat fins and power electronics 90 are disposed at opposing perpendicularity to the PCB of the controller 64. The controller 64 and the power electronics 90 are arranged like a saddle disposed over the motor 60 and axially aligned with the impeller assembly 62. This arrangement creates a smaller form factor or package outline to fit within the motor housing 58. In this way, the vacuum module 52 can take up less space within the passenger or other compartment of a vehicle.

In operation, when the motor 60 is turned on to drive the impeller assembly 62, air and debris are drawn in and enter through the hose connector 74 in the air inlet 70, for example through the vacuum hose. The debris is collected inside the debris canister 64, for example in the filter bag 89. Clean-air exits the debris canister 64 through the air outlet opening 78 and passes through the interconnecting duct 56 or 56a. From the interconnecting duct, the air is drawn into the air intake of the impeller assembly 62, through the impeller assembly 62, and exhausted out of the vacuum module through the air outlet openings 68. The exhausted air is also drawn across the PCB of the controller 64 and the motor 68, as well as the heat sink 88 before being exhausted through the air outlet openings 68 so as to cool the motor/impeller unit 57.

Figure 14:
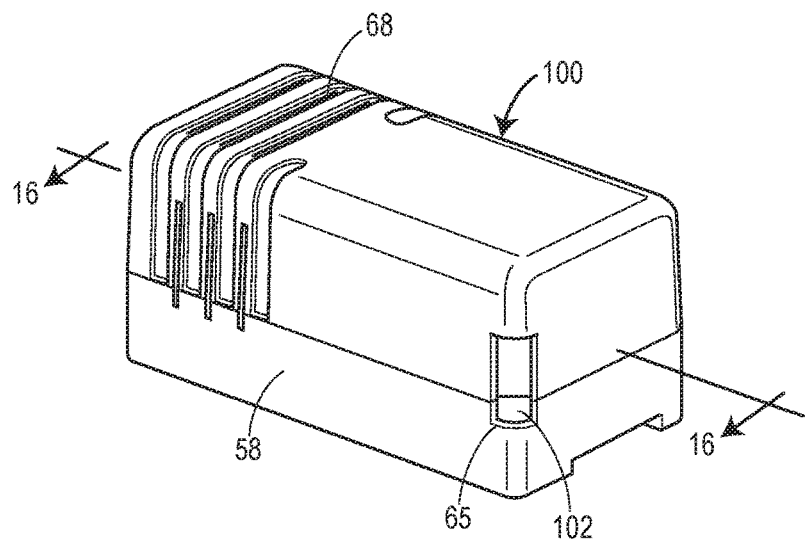
FIG. 14 is an isometric view of a vacuum module similar to FIG. 1, but with an alternative interconnecting duct receiver.
Figure 15:
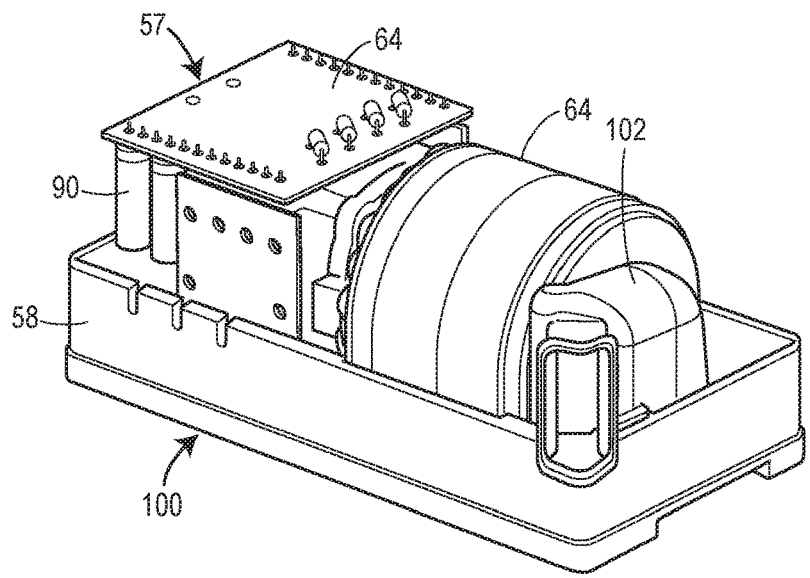
FIG. 15 is an isometric view of the vacuum module of FIG. 14 with a top portion of the motor housing removed.
Figure 17:
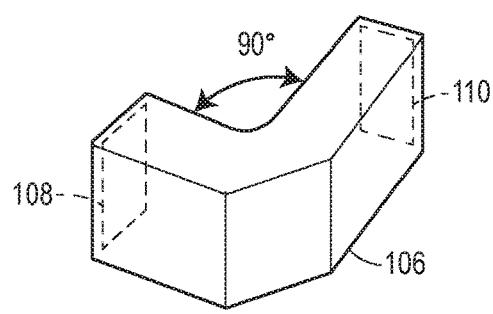
FIG. 17 is an isometric view of an interconnecting duct for use with the interconnecting duct receiver of FIGS. 14 and 15.
Figure 16:
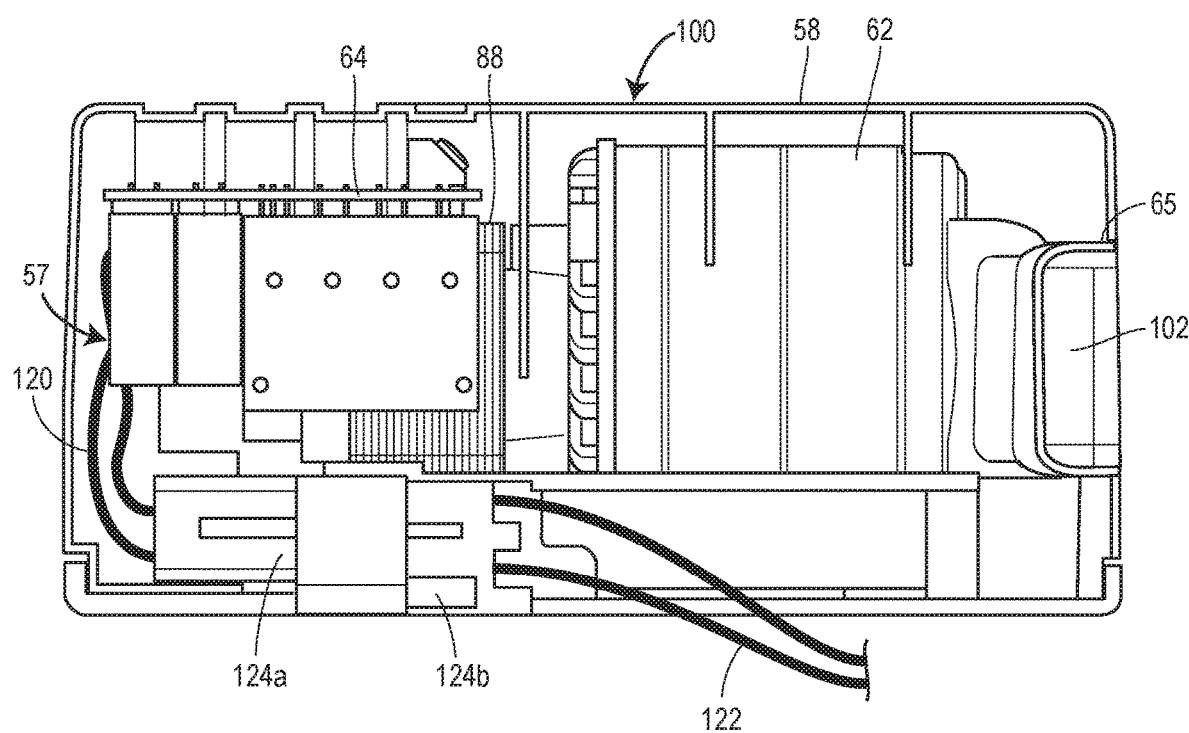
FIG. 16 is a longitudinal cross-sectional view of the vacuum module along the lines 16-16 of FIG. 14.
Figure 18:
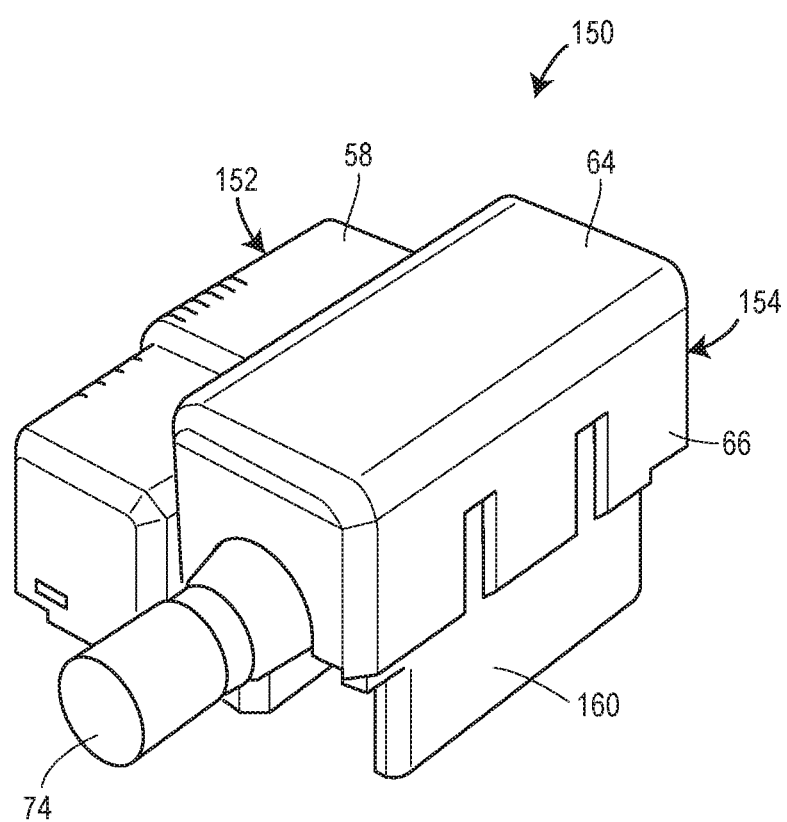
FIG. 18 is a rear isometric view of another vacuum cleaner to be mounted inside a vehicle according to the present disclosure.
Figure 19:
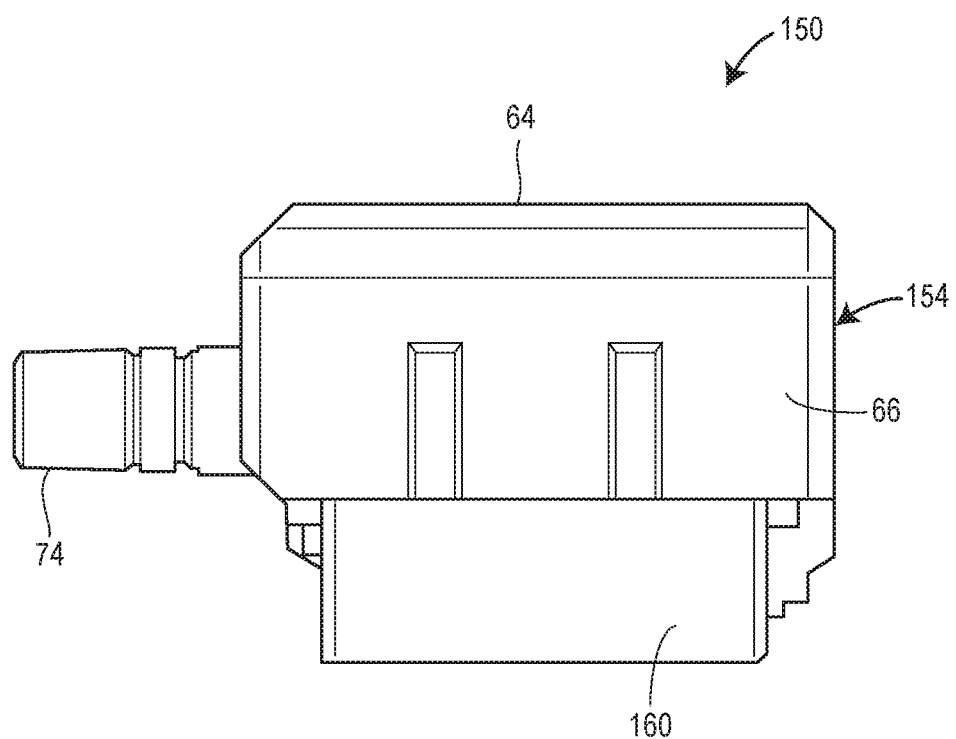
FIG. 19 is a right side view of the vacuum cleaner of FIG. 18.
Figure 20:
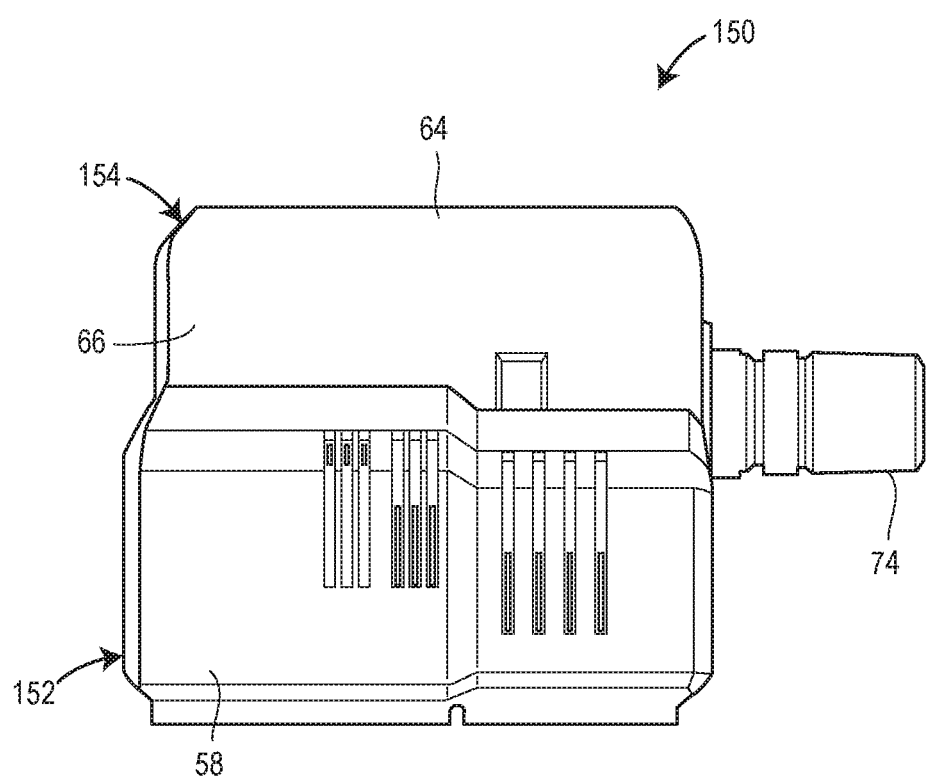
FIG. 20 is a left side view of the vacuum cleaner of FIG. 18.

FIGS. 14-16 illustrate a vacuum module 100, which is substantially similar to the vacuum module 52, except having a different intake receiver 102 for receiving an interconnecting duct with a different shape than the interconnecting ducts 56 and 56a. Thus, the vacuum module 100 also includes the motor/impeller unit 57 disposed and carried within the motor housing 58. However, rather than simply having an intake opening 65, the intake receiver 102 extends from the intake opening 65 of the motor housing to the air intake 85 of the impeller assembly 62. The intake receiver 102 forms a short duct 104 that extends from a corner of the motor housing 58 at an angle of 45° relative to each of the adjoining sidewalls of the motor housing toward the air intake 85 of the impeller assembly 62. The duct 104 is configured to receive an end of an interconnecting duct, such as the interconnecting duct 106 shown in FIG. 17.

The interconnecting duct 106, similar to the interconnecting ducts 56 and 56a, has a relatively rigid duct body extending from a first duct opening 108 at a first end of the duct body to a second duct opening 110 at a second end of the duct body. At least one, and preferably both ends of the duct body are configured to be inserted into the duct 104 of the intake receiver 102. In this exemplary arrangement, the interconnecting duct 106 forms a substantially right angle (i.e., 90°) between the first end and the second ends of the duct body. In this way, the vacuum module 100 may be operatively coupled to a collector module 54 (similarly modified to include the intake receiver 102 at the air exhaust opening 72) in both the in-line configuration as shown in FIG. 1 and the side-by-side configuration shown in FIG. 4. However, the interconnecting duct 106 may take other shapes and forms suitable for connecting the vacuum module 100 with a collector module 54, and thus is not limited to the particular exemplary shape illustrated in FIG. 17.

As illustrated in FIG. 16, the wire harness 120 for the controller 64 may conveniently be stored completely inside the motor housing 58. Although shown with regard to the vacuum module 100, this is equally applicable to any of the vacuum modules disclosed herein. In this way, the vacuum module 50 or 100 provides a neat package unit for installation in a vehicle with the wires contained inside the motor housing. Also as illustrated in FIG. 16, a power supply wire harness 122, such as power supply wires connected to the vehicle power supply system, may be fed out of the motor housing 58 through the bottom of the vacuum module 52.

Preferably, the control harness and the power supply wire harness are connected by a plug-type electrical connector with mating plug portions 124a/124b disposed at least partly inside the motor housing 58. In this way, the vacuum modules 50 or 100 can be easily retrofitted into an existing vehicle interior by simply plugging the power supply wire harness 122 into the controller harness 120. However, other connection mechanisms may also be used.

The vacuum module 100, when operatively coupled with the appropriately modified collector module 54 with the interconnecting duct 106 functions in substantially the same way as previously described relative to the vacuum module 52. The exemplary arrangement of FIGS. 14-16 includes a slightly different form factor arrangement for the motor housing 58, for example with different shaped air outlet opening 68 and slightly differently shaped upper and lower motor housing portions. Thus, it can be seen that the vacuum modules 52 and 100 may take different shapes, sizes, and form factors while still maintaining the same basic operational characteristics of the present disclosure.

FIGS. 18-23 illustrate yet another form factor and assembly arrangement of a vacuum cleaner 150 of the present disclosure. The vacuum cleaner 150 includes a vacuum module 152 and a collector module 154 operatively connected with each other by an interconnecting duct 156. The vacuum module 152 is substantially similar functionally to the vacuum modules 100 and 52, including for example the motor/impeller unit 57 disposed within the motor housing 58, but with a slightly different form factor of the motor housing 58 to conform to a specific vehicle interior. Similarly, the collector module 154 is substantially similar functionally to the collector module 54, including for example the debris canister 64 removably received within a collector housing 66, but also with a slightly different form factor to conform to the specific vehicle interior.

As best seen in FIGS. 18, 19, 21, and 22, a bracket 160 extends downwardly from the bottom of the collector housing 66 so that the collector housing 66 is disposed a slightly elevated level compared to the vacuum module 152 in a stepped configuration. In addition, a bracket 161 extends sideways from the bottom of the motor housing 58 upon which a portion of the bracket 160 rests. The bracket 160 is secured to the bracket 161, for example with screws or other types of fasteners in order to secure the vacuum module 152 and the collector module 154 in the stepped arrangement. Further, the interconnecting duct 156 has a different shape specifically designed to connect the collector module 154 to the vacuum module 152 in the stepped configuration.

Figure 21:
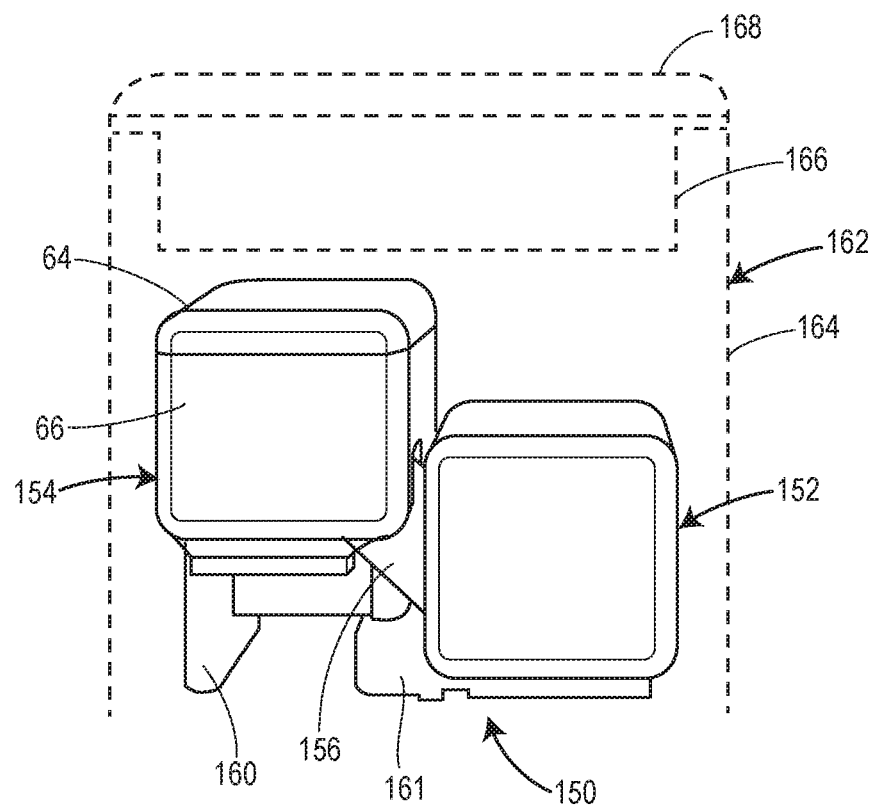
FIG. 21 is a front end view of the vacuum cleaner FIG. 18.
Figure 22:
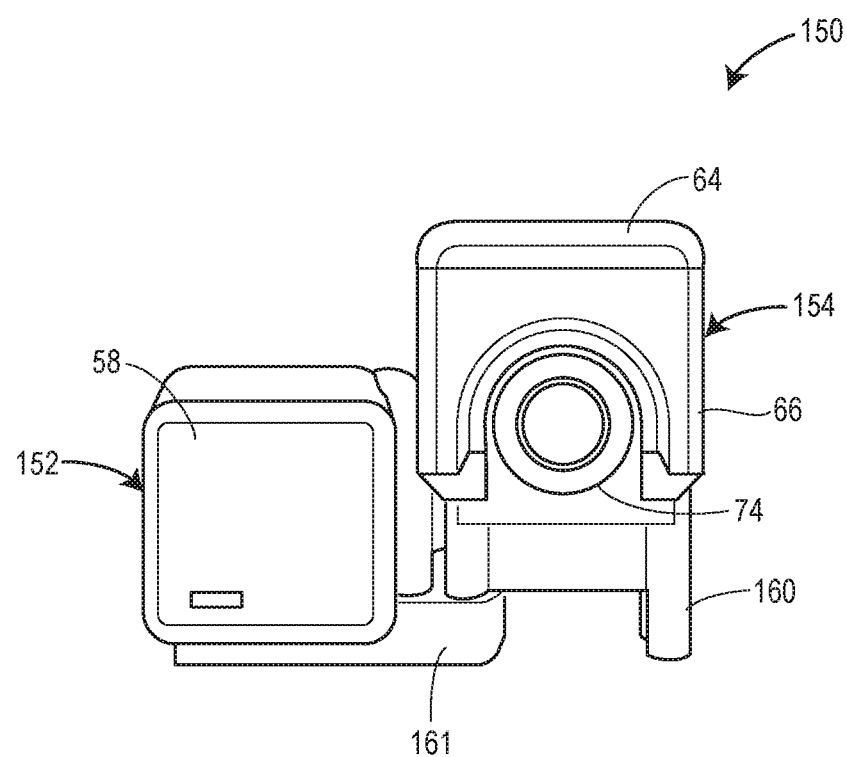
FIG. 22 is a rear end view of the vacuum cleaner of FIG. 18.
Figure 23:
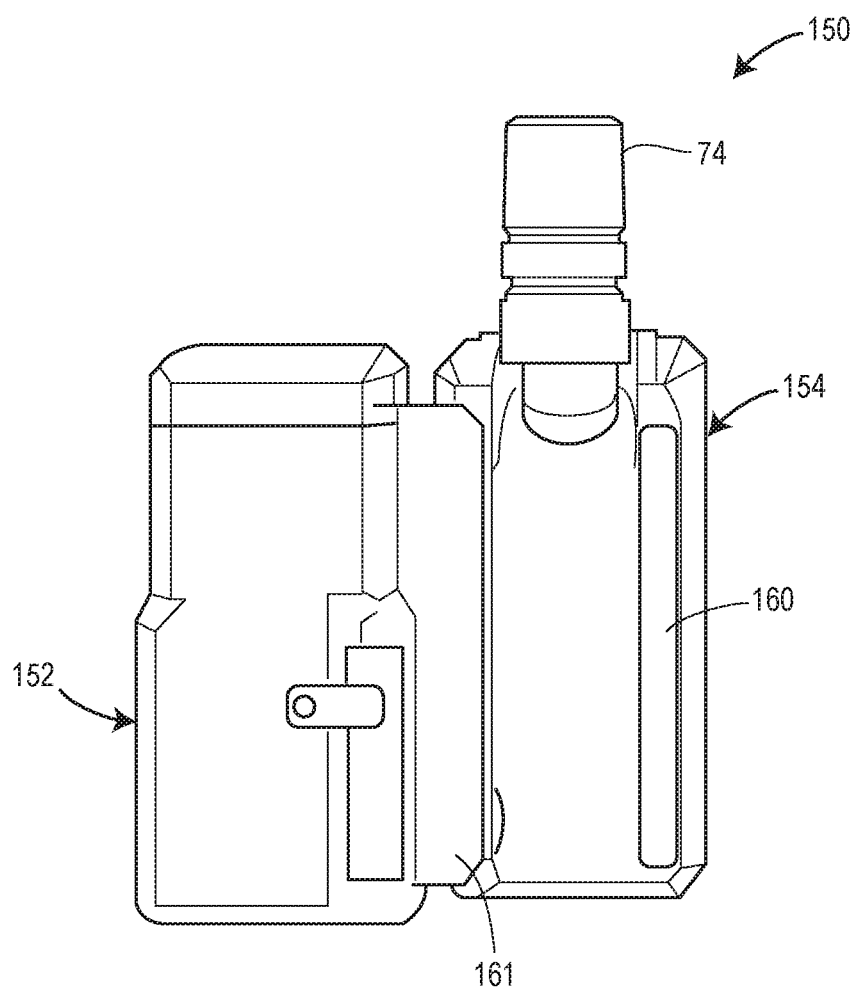
FIG. 23 is a bottom view of the vacuum cleaner of FIG. 18.

FIG. 21 illustrates an exemplary placement of the vacuum cleaner 150 within a center console 162 of a vehicle, for example between left and right front seats of a car or truck. Preferably, the collector module 154 is oriented within the center console 162 with the hose connector 74 projecting outwardly toward the back of the vehicle, for example, toward the back seat of a car. The center console 162 may take many different forms and/or shapes. In the illustrated example, the center console 162 includes a main console body 164 that sits over and around the vacuum cleaner 150. The center console 162 also includes a recessed tray 166 disposed above the vacuum cleaner 150 and a lid 168 that covers the recessed tray 166. However, the particular arrangement and/or features of the center console 162 may take almost an infinite variety of shapes and forms.

Except as otherwise described above, the vacuum cleaner 150 includes the same components and operates in the same manner as previously described herein relative to the exemplary arrangements illustrated in FIGS. 1-17. For brevity, the descriptions thereof are not repeated here, but rather the reader is directed to those descriptions for further detailed descriptions thereof.

FIGS. 24-32 illustrate additional embodiments and aspects of a vacuum cleaner according to the present disclosure including a different arrangement of the interconnecting duct, which operatively connects the vacuum module with the collector module. In this arrangement, a vacuum cleaner 500 includes a vacuum module 502 and a collector module 504 operatively connected with each other by an interconnecting duct 506, which provides a fluid flow path through which the vacuum module can draw a vacuum from and through the interconnecting duct as described previously. The vacuum module 502 and the collector module 504 are generally similar to the respective vacuum modules 52, 152, 302 and collector modules 54, 154, 304 and may include any one or more of the features described therewith, except as otherwise described hereinafter. For brevity, the shared features are not described again herein, but the reader is referred to the detailed descriptions thereof hereinabove.

Figure 24:
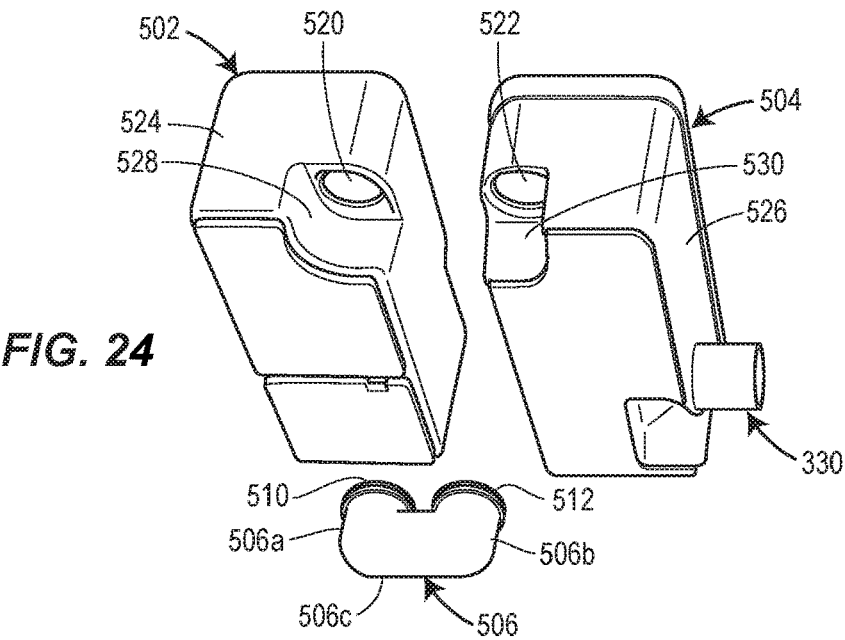
FIG. 24 is an isometric view of another vacuum cleaner in a partially disassembled condition according to further aspects of the disclosure.
Figure 27:
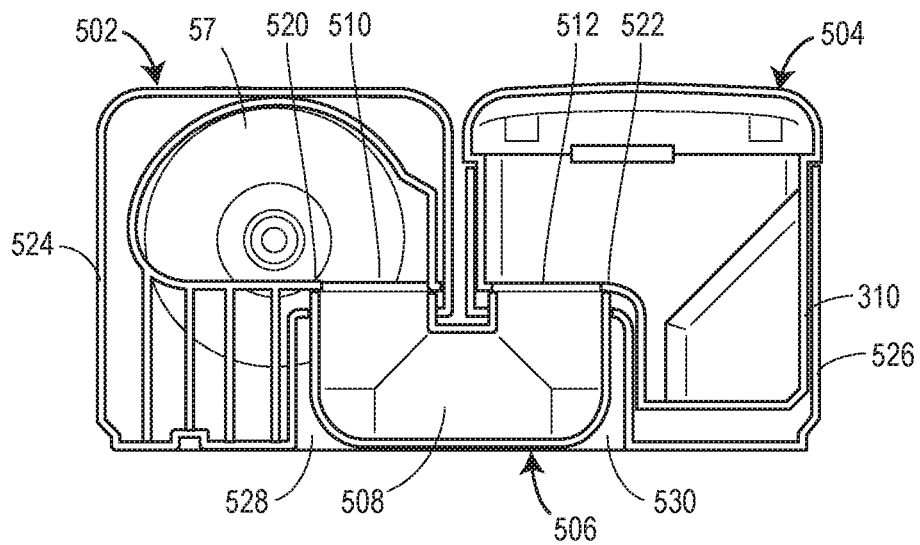
FIG. 27 is a cross-sectional view of the vacuum cleaner along the line A-A of FIG. 26.

As best seen in FIGS. 24 and 27, the interconnecting duct 506 has a substantially rigid body that forms a fluid flow duct 508 extending from a first duct opening 510 to a second duct opening 512. However, the interconnecting duct 506 has a different shape than other interconnecting ducts herein. In this exemplary arrangement, the rigid body of the interconnecting duct 506 is a generally U-shaped tube extending from the first duct opening 510 at a first end of the tube to the second duct opening 512 at a second end of the tube. The U-shaped tube has a first leg 506a and a second leg 506b extending upwardly from opposite ends of a base section 506c. The first duct opening 510 is formed at the distal end of the first leg 506a. The second duct 512 opening is formed at the distal end of the second leg 506b. The central axes of the left leg and the right leg are parallel with each other and perpendicular to the central axis of the base section. Each of the first and second duct openings 510, 512 is substantially circular, and the U-shaped tube has a substantially circular cross-section along its entire length from the first end to the second end. The fluid flow duct 508 also has a substantially circular cross-section along its entire length from the first duct opening 510 to the second duct opening 512.

Figure 28:
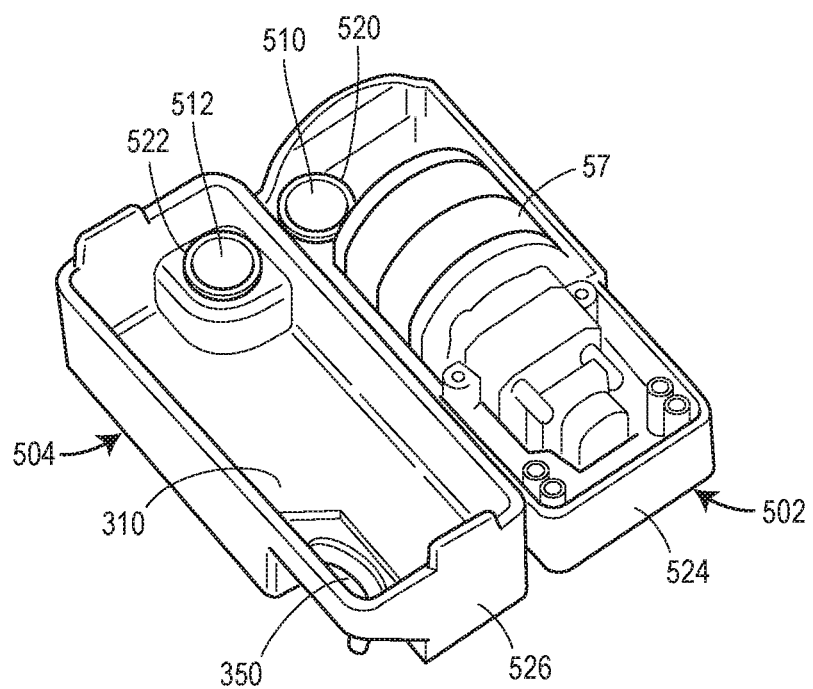
FIG. 28 is an isometric view of the vacuum cleaner FIG. 24 with top covers of the vacuum module and collector module removed to show the interior.

As best seen in FIGS. 24 and 28, the vacuum air intake port 520 (or intake opening) into the vacuum module 502 and the clean air exhaust port 522 (or air exhaust opening) out of the collector module 504 have shapes that correspond to the shapes of the first and second ends 510, 512 of the interconnecting duct 506. Thus, in this arrangement, each of the vacuum air intake port 520 and the clean air exhaust port 522 forms a circular opening through its respective housing, which allows the interconnecting duct 506 to rotate about the axes of the first and second legs 506a, 506b of the interconnecting duct 506 extending into the respective ports 520 and 522. However, in other arrangements, the shape of the interconnecting duct 506 may be different, and thus the shape of the air intake port 520 and the clean air exhaust port 522 may also have different shapes that correspond to the shape of the interconnecting duct. As illustrated in FIG. 27, when operatively installed, the first end 510 of the interconnecting duct 506 connects to the vacuum air intake port 520, and the second end 512 of the interconnecting duct 506 connects to the clean air exhaust port 522 so that air can be drawn from the interior of the collector module 504 into the interior of the vacuum module 502, for example, by the motor/impeller unit 57. As illustrated in FIGS. 27 and 28, the debris canister 310 may be operatively received within and removed from the collector housing 526 for ease of removing debris from the collector module 504, generally as described previously.

Each of the vacuum air intake port 520 and the clean air exhaust port 522 is formed in an upwardly and inwardly recessed section of a corner of the bottom wall of the respective motor housing 524 and collector housing 526. As best seen in FIG. 24, a first recessed portion 528 of the outer wall of the motor housing projects downwardly from the vacuum air intake port 520. The recessed portion 528 is sized to receive the first end 512 of the interconnecting duct 506 below the vacuum air intake port 520. A second recessed portion 530 of the outer wall of the collector housing 526 projects downwardly from the clean air exhaust port 522. The recessed portion 530 is sized to receive the second and 514 of the interconnecting duct 506 below the clean air exhaust port 522. The exterior face of each of the vacuum air intake port 520 and the clean air exhaust port 522 is aligned parallel with the bottom respective bottom walls of the motor housing 524 and the collector housing 526. Each of the first recessed portion 528 and the second recessed portion 530 is also recessed inwardly from two adjacent sidewalls of the respective housing. When the interconnecting duct 506 operatively connects the vacuum module 502 with the collector module 504, the first leg 506*a* is received within the first recessed portion 528, and the second leg 506*b* is received within the second recessed portion 530. With this arrangement, the interconnecting duct 506 can be rotated about an angle of at least 90° when operatively connected to the respective vacuum air intake port 520 and the clean air exhaust port 522. Thus, the recessed portions 528 and 530 allow the vacuum module 502 and the collector module 504 to be rotated about the ends 512 and 514 of the interconnecting duct 506 into different assembled configurations as shown and explained herein.

Figure 25A:
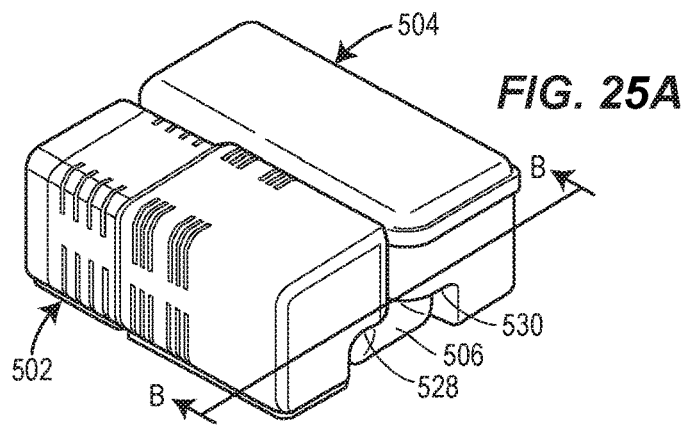
FIG. 25A is an isometric view of the vacuum cleaner of FIG. 41 in a first assembled arrangement.
Figure 26:
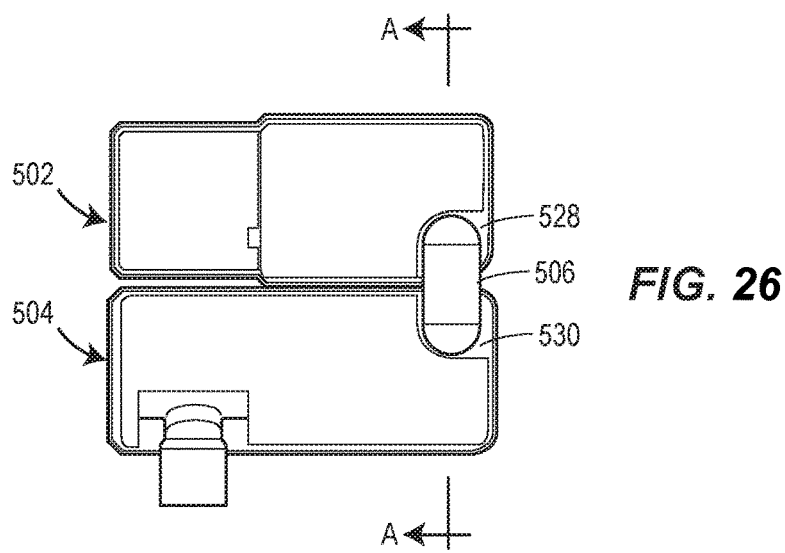
FIG. 26 is a bottom plan view of the vacuum cleaner of FIG. 24.
Figure 25B:
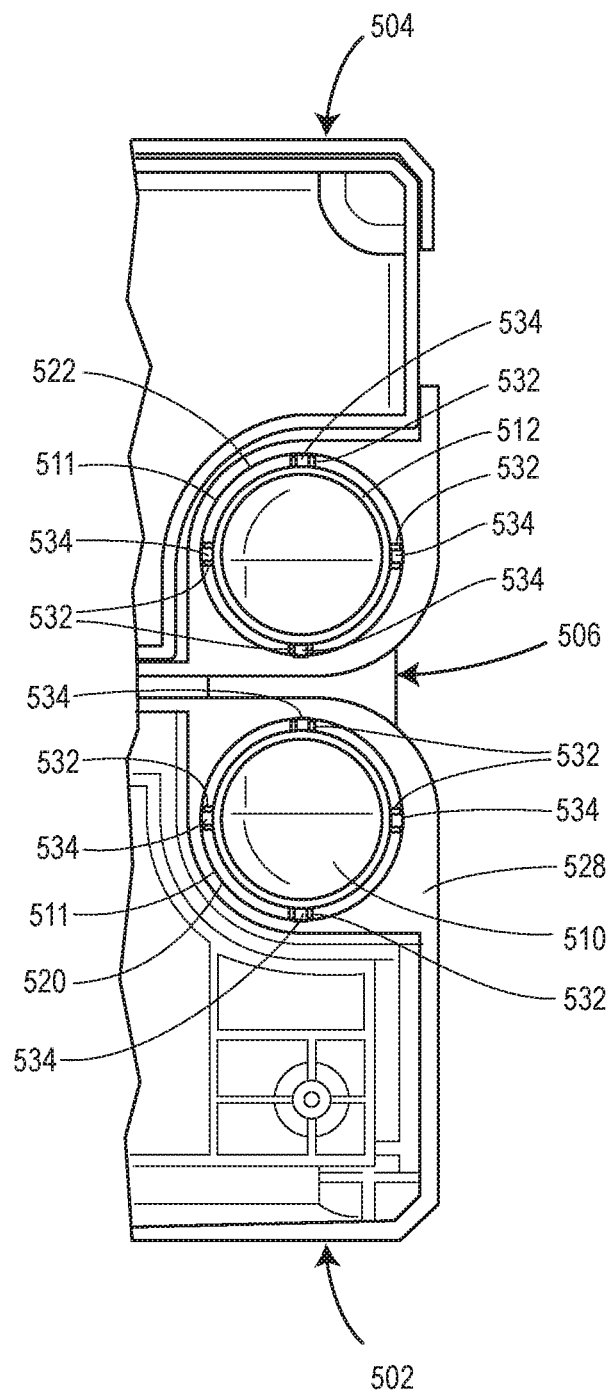
FIG. 25B is a cross-sectional view of a portion of the vacuum cleaner of FIG. 25A, taken along the line B-B of FIG. 25A.

As depicted in FIG. 25B, the interconnecting duct 506 may lock the collector module 504 to the vacuum module 502 via locking features. More specifically, receiving apertures 532 are disposed on a circumferential ledge 511 of each of the vacuum air intake port 520 and the clean air exhaust port 522. The receiving apertures 532 accept locking detents 534 located at each of the first and second ends 510, 512 of the tube or interconnecting duct 506. The locking detents 534 are disposed at every 90° position of pivot about the axis through each of the first and second legs 506*a*, 506*b*. In addition, and in one example, the receiving apertures 532 and the locking detents 534 are disposed equidistant from each other.

In use, the user or installer can simply pivot the collector module 504 or the vacuum module 502 about the respective axis to a desired assembly configuration, such as the side-by-side, in-line, or perpendicular shaped configuration. Then, the user or installer can lock the position of the canister using the locking detents 534. This arrangement makes it easier to ensure that a good vacuum path is formed between the vacuum module 502 and the collector module 504 in any of the pre-selected assembly configurations.

In one example, and as further depicted in FIG. 25B, each locking detent 534 may take the form of a rounded tab that outwardly extends from the first and second ends 510, 512 of the duct 506. As one of ordinary skill in the art will appreciate, the locking detents 534 may alternatively take the form of various other shapes, which may match the shape of the receiving apertures 532, for example, and still fall within the scope of the present disclosure. Still further, while FIG. 25B depicts four locking detents 534 and four corresponding receiving apertures 532, more or fewer locking detents or receiving apertures may alternatively be used and still fall within the scope of the present disclosure.

In another example, each receiving aperture 532 may be rounded or semi-circular in shape. Alternatively, the receiving apertures 532 may take the form of various other shapes, which may match the shape of the locking detents 534, for example, and still fall within the scope of the present disclosure.

Figure 25C:
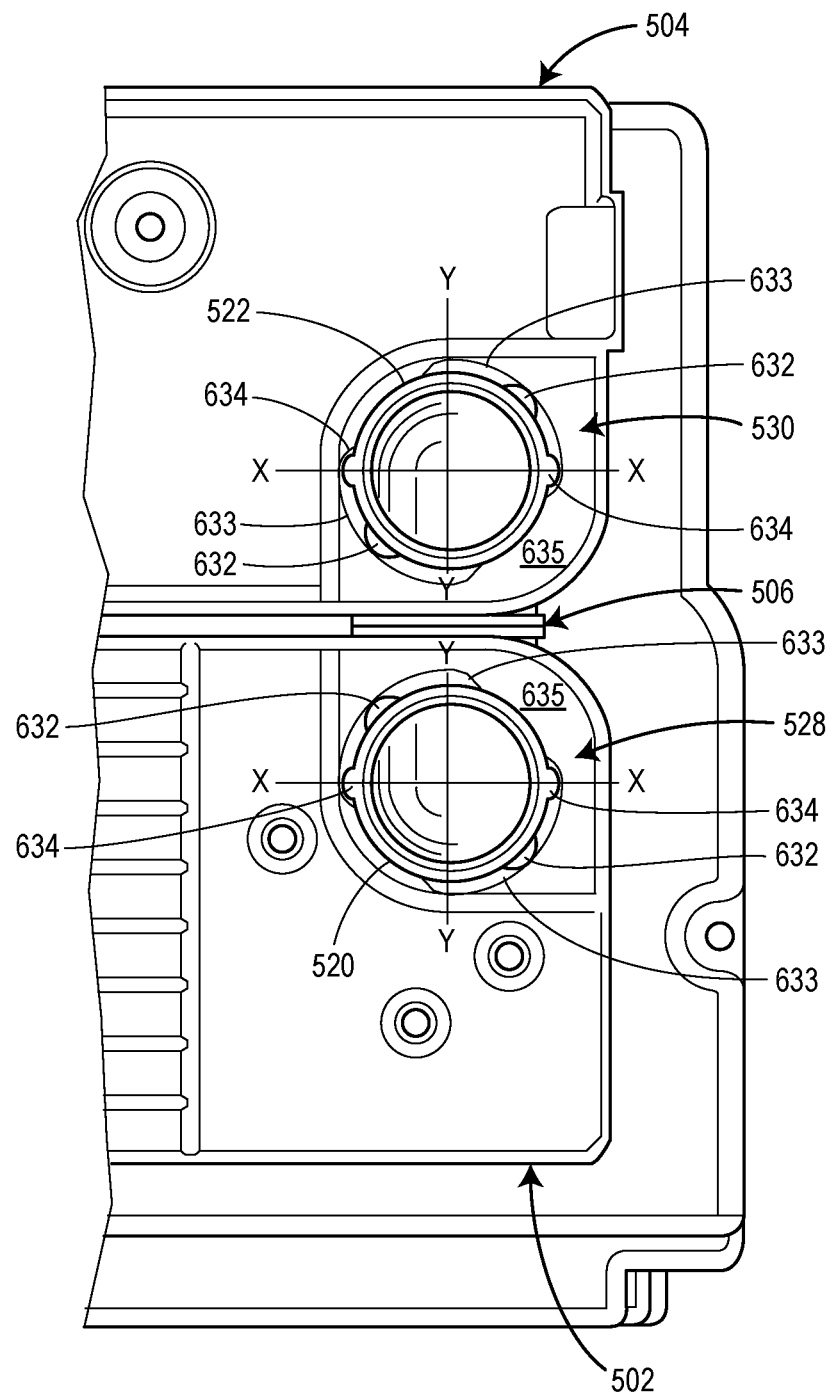
FIG. 25C is another cross-sectional view of an alternative portion of the vacuum cleaner.

Referring now to FIG. 25C, alternative locking features of the interconnecting duct 506 are depicted. More specifically, and as noted, the interconnecting duct 506 may lock the collector module 504 to the vacuum module 502. In this example, the locking features include a pair of receiving apertures 632 that are disposed opposite each other on a corresponding pair of partially circumferential indentations 633. The pair of partially circumferential indentations 633 are disposed on a surface 635 of each of the first recessed portion 528 and the second recessed portion 530 (FIG. 24). As noted, the recessed portion 528 is sized to receive the first end 510 of the interconnecting duct 506 below the vacuum intake port 520, and the recessed portion 530 is sized to receive the second end 512 of the interconnecting duct 506 below the clean air exhaust port 522.

As further depicted in FIG. 25C, the receiving apertures 632 accept locking detents 634 located at each of the first and second ends 510, 512 of the tube or the interconnecting duct 506. The locking detents 634 are disposed opposite to and equidistant from each other along the circumferential edge of each of the first and second ends 510, 512. In use, the user can simply pivot the collector module 504 or the vacuum module 502 about the respective axis to a desired assembly configuration, such as the side-by-side, in-line, or perpendicular shaped configuration. Then, the user can lock the position of the canister using the locking detents 634. This arrangement makes it easier for the user to ensure that a good vacuum path is formed between the vacuum module 502 and the collector module 504 in any of the pre-selected assembly configurations.

More specifically, in this example the interconnecting duct 506 is in an unlocked position when the locking detents 634 are disposed in the corresponding receiving features 632. Said another way, when the locking detents 634 are disposed in the receiving features 632 at an angle of approximately 45 degrees from one of the X-axis or the Y-axis of one of the vacuum intake port 520 or the clean air exhaust port 522, the interconnecting duct 506 is in an unlocked position. However, when the locking detents 634 are disposed along the X-axis or the Y-axis of the vacuum intake port 520 or the clean air exhaust port 522, the interconnecting duct 506 is in a locked position. More generally, when the locking detents 634 are disposed outside of the receiving features 632 along another portion of the partially circumferential indentations 633, the interconnecting duct 506 is in the locked position, as depicted in FIG. 29C.

The locking detents 634 and the corresponding receiving apertures 632 are rounded in shape. However, one of ordinary skill in the art will appreciate that both the locking detents 634 and the receiving apertures 632 may alternatively take the form of various other shapes and still fall within the scope of the present disclosure.

FIGS. 25A-28 illustrate the vacuum cleaner 500 in a side-by-side assembled configuration, in which the long side wall of the vacuum module 502 is located along and immediately adjacent to the long side wall of the collector module 504. As best seen in FIGS. 25A and 27, the cavities 528 and 530 are shaped and sized so that the interconnecting duct 506 is received and fits completely within the two cavities 528 and 530. In this configuration, the axes of the interconnecting duct 506 are arranged in a plane parallel with and recessed inwardly from the short end walls of the motor housing 524 and the collector housing 526. Thus, the interconnecting duct 506 does not extend below either of the bottom wall the motor housing 524 or the bottom wall of the collector housing 526. Further, the interconnecting duct 506 does not extend outwardly from the end walls of either of the motor housing 524 or the collector housing 526. Thus, the shape of the two cavities 528 and 530 provides a compact form factor for the vacuum cleaner 500 by recessing the interconnecting duct 506 inwardly from the outermost boundaries of the vacuum module 502 and the collector module 504.

Figure 29:
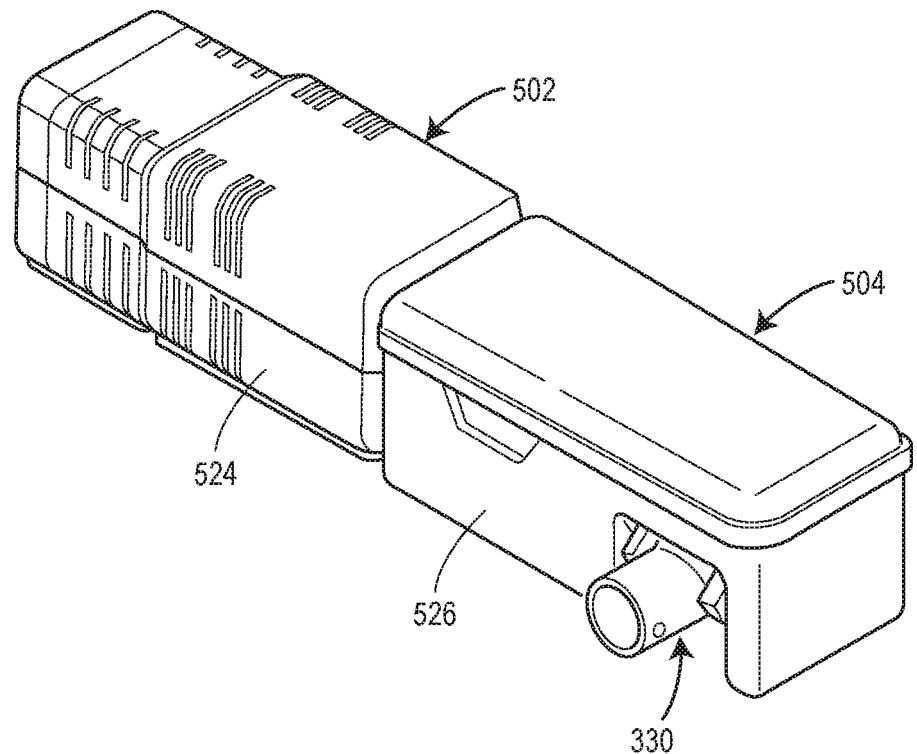
FIG. 29 is an isometric view of the vacuum cleaner of FIG. 24 in a second assembled arrangement.
Figure 30:
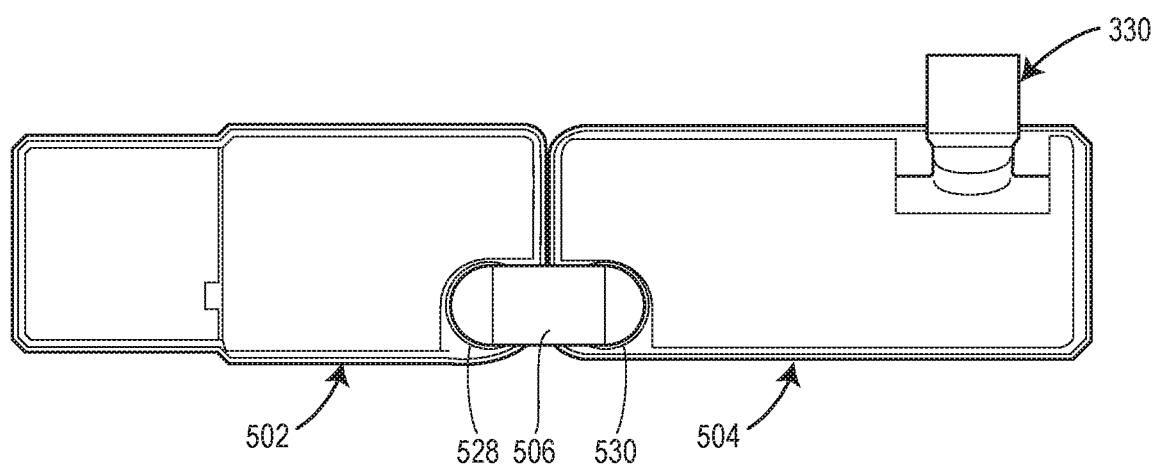
FIG. 30 is a bottom plan view of the vacuum cleaner arrangement of FIG. 29.

FIGS. 29 and 30 illustrate the vacuum cleaner 500 in an end-to-end (or in-line) assembled configuration, in which the short end wall of the vacuum module 502 is located along and immediately adjacent to the short end wall of the collector module 504. In this configuration, the axes of the interconnecting duct 506 are arranged in a plane parallel with and recessed inwardly from the long side walls of the motor housing 524 and the collector housing 526. The cavities 528 and 530 are also shaped and sized so that the interconnecting duct 506 is received and fits completely within the two cavities 528 and 530 in the end-to-end assembled configuration. Thus, similar to the side-by-side configuration of FIGS. 25A-28, the interconnecting duct 506 does not extend below either of the bottom wall the motor housing 524 or the bottom wall of the collector housing 526. In addition, the interconnecting duct 506 does not extend outwardly from the side walls of either of the motor housing 524 or the collector housing 526.

Figure 31:
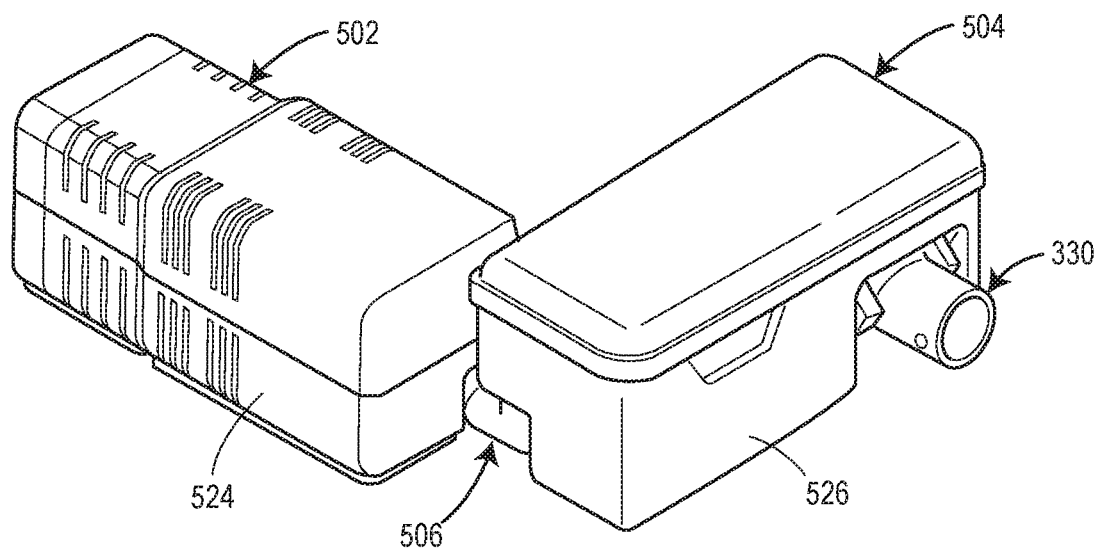
FIG. 31 is an isometric view of the vacuum cleaner of FIG. 24 in a third assembled arrangement.
Figure 32:
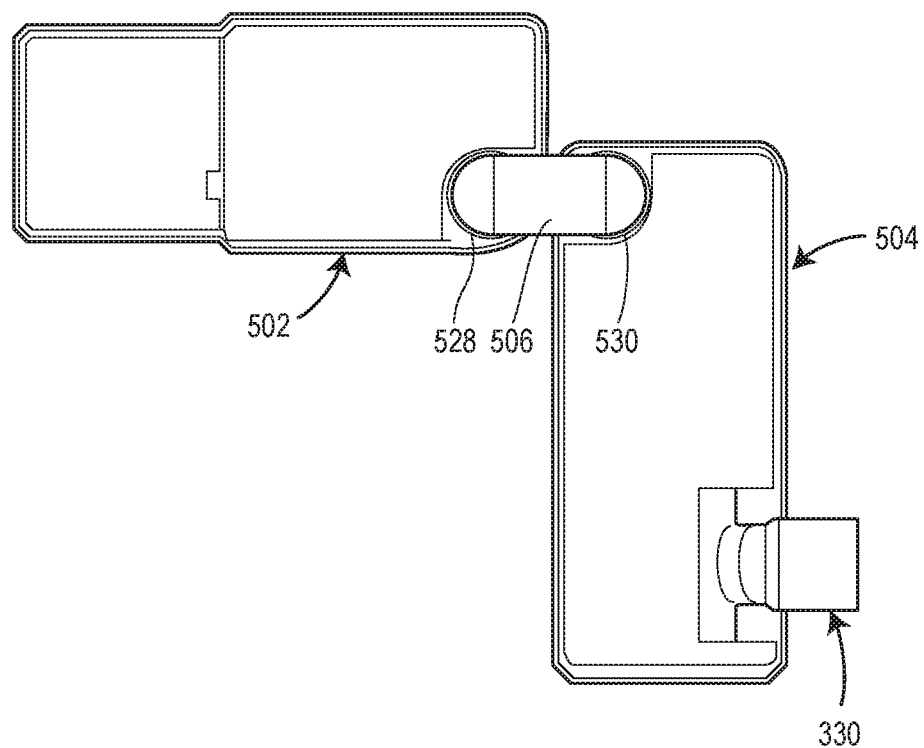
FIG. 32 is a bottom plan view of the vacuum cleaner arrangement of FIG. 31.

FIGS. 31 and 32 illustrate the vacuum cleaner 500 in a perpendicular assembled configuration, in which the short end wall of the vacuum module 502 is located along and immediately adjacent to an end portion of the long side wall of the collector module 504. In this configuration, the axes of the interconnecting duct 506 are arranged in a plane parallel with and recessed inwardly from the long side wall of the motor housing 524 and the short end wall of the collector housing 526. The cavities 528 and 530 are also shaped and sized so that the interconnecting duct 506 is received and fits completely within the two cavities 528 and 530 in the perpendicular assembled configuration. Thus, similar to the side-by-side and the end-to-end configurations of FIGS. 25A-30, the interconnecting duct 506 does not extend below either of the bottom wall the motor housing 524 or the bottom wall of the collector housing 526. In addition, the interconnecting duct 506 does not extend outwardly from the side wall of the motor housing 524 or end wall of the collector housing 526.

The particular shapes and sizes of the collector modules, the vacuum modules, and the interconnecting ducts, may be modified to conform to many different space configurations as may be dictated by the shapes and sizes of the components within the vehicle and/or decorative design considerations. Typically, it is anticipated that the vacuum cleaners will be configured for installation within the passenger and/or cargo compartment of a vehicle. However, the vacuum cleaners could be configured for installation in other areas of a vehicle as well.

A vacuum cleaner according to some aspects of the present disclosure provides an assembly that may be easily configured to conform to different spaces within a vehicle. The modular nature of the vacuum cleaners according to some aspects of the present disclosure allows a single vacuum cleaner to be assembled in different arrangements for different vehicle configurations. Additional and/or alternative functional benefits of vacuum cleaners according to various aspects of the present disclosure will be apparent to the person of ordinary skill.

The technical examples described and shown in detail herein are only exemplary of one or more aspects of the teachings of the present disclosure. Additional aspects, arrangements, and forms within the scope of the appended claims and all technically operative combinations of features disclosed herein are contemplated, the rights to which are expressly reserved.

What is claimed:

1. A modular vacuum cleaner, comprising:
   a vacuum module configured to draw a vacuum and having a longitudinal axis;
   a collector module configured to collect debris and having a longitudinal axis; and
   an interconnecting duct that operatively couples the vacuum module to the collector module such that the vacuum module pulls air into, through, and out of the collector module when drawing a vacuum;
   wherein the interconnecting duct is configured to operatively couple the collector module to the vacuum module in each one of a plurality of arrangements, and the plurality of arrangements includes a perpendicular configuration, an in-line configuration, and a side-by-side configuration, and
   wherein the perpendicular configuration is a configuration in which the longitudinal axis of the vacuum module is substantially perpendicular to the longitudinal axis of the collector module,
   wherein the in-line configuration is a configuration in which the longitudinal axis of the vacuum module is substantially coaxial to the longitudinal axis of the collector module,
   wherein the side-by-side configuration is a configuration in which the longitudinal axis of the vacuum module is substantially parallel to but offset from the longitudinal axis of the collector module.

2. The vacuum cleaner of claim 1, wherein the vacuum module is disposed immediately adjacent the collector module.

3. The vacuum cleaner of claim 1, wherein the vacuum module is disposed a predefined distance from the collector module by the interconnecting duct and a gap is disposed between the vacuum module and the collector module.

4. The vacuum cleaner of claim 1, wherein the vacuum module includes a motor/impeller unit disposed within a motor housing.

5. The vacuum cleaner of claim 1, wherein the collector module includes a collector housing and a debris canister removably disposed in the collector housing, wherein the debris canister can be slidably removed from and reinserted into the collector housing.

6. The vacuum cleaner of claim 5, wherein the collector housing includes a hose connector coupled to an air inlet, wherein the hose connector is configured to be coupled to a vacuum hose.

7. The vacuum cleaner of claim 1, wherein the vacuum module and the collector module are configured to fit into one or more of a space between two seats of the vehicle, a cargo compartment of the vehicle, or a wall of a passenger compartment of the vehicle, when the vacuum module and the collector module are operatively coupled together.

8. The vacuum cleaner of claim 7, wherein the vacuum module and collector module are configured to fit within a console housing.

9. The vacuum cleaner of claim 1, wherein the interconnecting duct has a substantially rigid body that forms a fluid flow duct extending from a first duct opening to a second duct opening, the rigid body comprising a U-shaped tube extending from the first duct opening at a first end of the tube to the second duct opening at a second end of the tube.

10. The vacuum cleaner of claim 9, wherein the U-shaped tube has a first leg and a second leg extending upwardly from opposite ends of a base section, wherein the first duct opening is formed at the distal end of the first leg, and the second duct opening is formed at the distal end of the second leg.

11. The vacuum cleaner of claim 10, wherein central axes of the left leg and the right leg are parallel with each other and perpendicular to a central axis of the base section.

12. The vacuum cleaner of claim 9, wherein each of the first and second duct openings is substantially circular.

13. The vacuum cleaner of claim 9, wherein the U-shaped tube has a substantially circular cross-section along its entire length from the first end to the second end.

14. The vacuum cleaner of claim 9, wherein the fluid flow duct has a substantially circular cross-section along its entire length from the first duct opening to the second duct opening.

15. The vacuum cleaner of claim 9, wherein the vacuum module comprises a motor housing that forms a vacuum air intake port to operatively connect to the first end of the tube, wherein the vacuum air intake port is formed in a first recessed portion of the motor housing; and wherein the collector module comprises a collector housing that forms a clean air exhaust port to operatively connect to the second end of the tube, and wherein the clean air exhaust port is formed in a second recessed portion of a the collector housing.

16. The vacuum cleaner of claim 15, wherein one or more of the first recessed portion projects from the vacuum air intake port and the second recessed portion projects from the clean air exhaust port.

17. The vacuum cleaner of claim 15, wherein the air intake port and the clean air exhaust port each include at least one receiving aperture that accepts at least one locking detent of the first and second ends of the tube to lock a position of the vacuum module and the collector module.

18. The vacuum cleaner of claim 15, wherein a pair of indentations is disposed on a surface of the first recessed portion and the second recessed portion, each indentation having a receiving aperture that accepts a locking detent of the first and second ends of the tube to unlock a position of the vacuum module and the collector module.

19. The vacuum cleaner of claim 1, wherein the vacuum module further comprises:

an intake receiver configured to receive at least one end of the interconnecting duct.

20. A vacuum cleaner comprising:
a vacuum module configured to draw a vacuum;
a collector module configured to collect debris;
an interconnecting duct that operatively couples the vacuum module to the collector module such that the vacuum module pulls air into, through, and out of the collector module when drawing a vacuum;
a first bracket that rigidly couples the vacuum module to the collector module; and
a second bracket that extends from the collector module, wherein the collector module is disposed at an elevated level compared to the vacuum module in a stepped configuration.

21. The vacuum cleaner of claim 20, wherein the vacuum module and the collector module are arranged in a side-by-side configuration.

22. A vacuum cleaner mounted in a vehicle, comprising:
a vacuum module configured to draw a vacuum, wherein the vacuum module includes a motor/impeller unit disposed within a motor housing and a longitudinal axis; and
a collector module configured to collect debris, wherein the collector module includes a collector housing, a debris canister removably disposed in the collector housing and a longitudinal axis;
wherein each of the motor housing and the collector housing is fixedly attached to the vehicle; and
wherein the collector module is operatively coupled to the vacuum module in each one of a plurality of arrangements, the plurality of arrangements including a perpendicular configuration, an in-line configuration, and a side-by-side configuration, and
wherein the perpendicular configuration is a configuration in which the longitudinal axis of the vacuum module is substantially perpendicular to the longitudinal axis of the collector module,
wherein the in-line configuration is a configuration in which the longitudinal axis of the vacuum module is substantially coaxial to the longitudinal axis of the collector module
wherein the side-by-side configuration is a configuration in which the longitudinal axis of the vacuum module is substantially parallel to but offset from the longitudinal axis of the collector module.

23. The vacuum cleaner of claim 22, wherein the debris canister can be slidably removed from and reinserted into the collector housing without disconnecting the collector housing or the motor housing from the vehicle.

* * * * *